(12) United States Patent
Jablon

(10) Patent No.: US 7,139,917 B2
(45) Date of Patent: Nov. 21, 2006

(54) SYSTEMS, METHODS AND SOFTWARE FOR REMOTE PASSWORD AUTHENTICATION USING MULTIPLE SERVERS

(75) Inventor: David P. Jablon, Westboro, MA (US)

(73) Assignee: Phoenix Technologies Ltd., Milpitas, CA (US)

( * ) Notice: Subject to any disclaimer, the term of this patent is extended or adjusted under 35 U.S.C. 154(b) by 723 days.

(21) Appl. No.: 09/872,659

(22) Filed: May 31, 2001

(65) Prior Publication Data

US 2002/0067832 A1    Jun. 6, 2002

Related U.S. Application Data

(60) Provisional application No. 60/215,835, filed on Jul. 3, 2000, provisional application No. 60/209,258, filed on Jun. 5, 2000.

(51) Int. Cl.
    *H04L 9/14* (2006.01)
(52) U.S. Cl. .......................................... 713/183; 726/5
(58) Field of Classification Search ................ 380/262, 380/47, 286; 713/194, 183, 168, 180; 726/5
    See application file for complete search history.

(56) References Cited

U.S. PATENT DOCUMENTS

| | | | |
|---|---|---|---|
| 5,535,276 A * | 7/1996 | Ganesan ..................... 713/155 |
| 5,544,322 A | 8/1996 | Cheng et al. |
| 5,557,346 A * | 9/1996 | Lipner et al. ................ 380/286 |
| 5,717,756 A * | 2/1998 | Coleman ..................... 713/155 |
| 5,832,211 A | 11/1998 | Blakely, III et al. |
| 6,044,155 A * | 3/2000 | Thomlinson et al. ........ 713/155 |
| 6,161,185 A * | 12/2000 | Guthrie et al. .............. 713/201 |
| 6,226,383 B1 * | 5/2001 | Jablon ........................ 380/30 |
| 6,311,276 B1 * | 10/2001 | Connery et al. ............. 713/201 |
| 6,510,513 B1 * | 1/2003 | Danieli ....................... 713/156 |

FOREIGN PATENT DOCUMENTS

GB    2329096    10/1999

OTHER PUBLICATIONS

IBM. "Key Manager for Multiple Distributed Computing Environment" Sep. 1, 1995.

* cited by examiner

*Primary Examiner*—Jacques H Louis Jacques
*Assistant Examiner*—Andrew Nalven

(57) ABSTRACT

Systems, methods and software that enable multiple servers to verify a password, without providing any single server, client or network attacker with the ability to validate guesses for the password off-line is disclosed. Password security is maintained in a very simple model, requiring no previously secured or server-authenticated channel between the client and any servers. Data may be protected by a small password, and no other keys, remains secret even against an enemy that compromises any, but not all, of two or more cooperating authenticating servers.

21 Claims, 4 Drawing Sheets

Fig. 4

| | Alice | $B_1$ | $B_2$ | Directory |
|---|---|---|---|---|
| 401 | | {UserID, $y_1$, V} | {UserID, $y_2$, V} | {UserID, $encrypt(K_m\{H_P, U\})$} |
| 402 | P = func(password) | | | |
| 403 | $m_1 = P^x$ | | | |
| 404 | UserID, $m_1 \to B_1, B_2$ | | | |
| 405 | | $m_2 = m_1^{y_1}$ | | |
| 407 | | record $m_2$ | | |
| 407 | | Alice $\leftarrow m_2$ | | |
| 408 | | | $m_3 = m_1^{y_2}$ | |
| 409 | | | record $m_1$ | |
| 410 | | | Alice $\leftarrow m_3$ | |
| 411 | | | | |
| 412 | $K_m = hash(m_2 * m_3)^{1/x}$ $= hash(K_1 * K_2)$ | | | |
| 413 | decrypt encrypted data using $K_m$ to get $H_P$ and U | | | |
| 414 | if $H_P$ != hash(P), | | | |
| 415 | abort | | | |
| 416 | $m_4 = sign(U, m_1) \to B_1, B_2$ | | | |
| 417 | | verify $m_4$ signature of $m_1$ using V | verify $m_4$ signature of $m_1$ using V | |
| 418 | | if verified, | if verified, | |
| 419 | | erase $m_1$ event | erase $m_1$ event | |

| | Alice | B₁ | B₂ | Directory |
|---|---|---|---|---|
| | | {UserID, $y_1$, V} | {UserID, $y_2$, V} | {UserID, $encrypt(K_m\{H_P, U\})$} |
| 501 | | | | |
| 502 | P = func(password) | | | |
| 503 | $m_1 = P^x$ | | | |
| 504 | UserID, $m_1 \to B_1$ | | | |
| 505 | | $m_2 = m_1^{y_1}$ | | |
| 506 | | record $m_1$ | | |
| 507 | | UserID, $m_2 \to B_2$ | | |
| 508 | | | $m_3 = m_2^{y_2}$ | {Alice ← $encrypt(K_m\{H_P, U\})$} |
| 509 | | | record $m_3$ | |
| 510 | | | $B_1 \leftarrow m_3$ | |
| 511 | | Alice ← $m_3$ | | |
| 512 | $K_m = hash(m_3^{1/x})$ $= hash(P^{y_1 y_2})$ | | | |
| 513 | decrypt encrypted data using $K_m$ to get $H_p$ and U | | | |
| 514, 515 | if $H_p$ != hash(P), abort | | | |
| 516 | $m_4 = sign(U, m_1, m_3) \to B_1$ | | | |
| 517 | | verify $m_4$ signature of $m_1$ using V | | |
| 518, 519 | | if verified, erase $m_1$ event | | |
| 520 | | $m_4 \to B_2$ | verify $m_4$ signature of $m_1$ using V | |
| 521, 522 | | | if verified, erase $m_1$ event | |

SYSTEMS, METHODS AND SOFTWARE FOR REMOTE PASSWORD AUTHENTICATION USING MULTIPLE SERVERS

This application claims the benefit of U.S. Provisional Application No. 60/209,258, filed Jun. 5, 2000 and U.S. Provisional Application No. 60/215,835, filed Jul. 3, 2000.

BACKGROUND

The present invention relates generally to computer security, and more particularly, to systems, methods and software that provide for remote password authentication using multiple servers.

Password-based authentication is the foundation of most personal authentication systems. Even when supplemented with carry-around tokens, smart-cards, and biometrics, the simple memorized password typically remains an essential core factor for establishing human identity in computer transactions. Low-grade passwords, the kind that people can easily memorize, are a particularly tough problem for many otherwise secure systems. To accommodate low-grade passwords, zero-knowledge password protocols were developed to eliminate network threats. However, a remaining problem is how to prevent attack on password verification data when that data becomes available to an enemy.

In a typical password system, a server maintains verification data for the password, which may be a copy of the password itself. In UNIX systems, for extra security, the verification data is an iterated one-way function of the password, which is typically stored in a file. This file is often further protected so that unprivileged users and programs do not have access to it. The classic UNIX password attack is where an attacker somehow has access to the file of password verification data, and runs a password-cracking tool against it to determine or "crack" as many passwords as possible. Password cracking is simply the application of the one-way function to a list of candidate passwords. When the output of the one-way function matches the verification data, the attacker knows he has guessed the correct password. Such attacks may be optimized to try the most common or likely passwords first, so as to be able to crack as many passwords as possible in a given period of time.

A goal is to reduce the threat of server-based attack on a password as much as possible in a password-based client/server authentication system, with the simplest possible security model—that is, using as few assumptions as possible. The goal is to prevent disclosure of the password even in the face of total unconstrained attacks on a server. In the present model, it is presumed that the attacker has the ability to alter a server's software, access all data available to that server, and control the use of that server while it authenticates legitimate and unsuspecting users.

To achieve this goal, it is clear that one needs to use more than one machine. In any single machine system, one who can access the user's password verification data, or can access any password-encrypted data, has sufficient information to perform an unconstrained off-line brute-force attack by simulating the actions of the user. The problem is specifically how to split password verification data among two or more servers, so as to eliminate this risk. No single server should have the ability to mount an off-line brute force attack.

Public-key cryptography is now becoming recognized as a crucial tool for secure personal electronic transactions. Personal digital signatures are expected to have widespread applications. However, a big problem is in how to protect and manage the user's private key. Leaving it on the client machine, perhaps weakly encrypted with the password, is an undesirable security risk. It seems foolish to leave persistent password-crackable data on client machines where the security is all-too-often notoriously difficult to manage. Furthermore, in a model where a number of users can share a single machine, it becomes impractical to require local storage of user credentials.

One class of user authentication solutions for so-called "roaming" users keeps the user's private credential stored on a remote server, and uses password-based authentication to retrieve these credentials. Strong zero-knowledge password (ZKP) protocols address many of the threats in these solutions, by eliminating network-based brute-force attacks, while at the same time eliminating the dependency on other stored keys and certificates on the client machine. ZKP protocols are essential for the multi-server case as well.

Two models for multi-server secure roaming systems are discussed: a strong model and a weaker model. In both models the attacker is presumed to be able gain access to copies of password-verification data, and has the ability to perform computations over a reasonably long period of time. (Reasonably long means unconstrained, but within the limits of computational feasibility. An arbitrarily long computation would be able to crack arbitrarily large public keys. As in most cryptographic methods, it is presumed that some practical upper-bound can be established for the time and power available to potential attackers, and that corresponding safe minimum reasonable sizes for keys may be determined.)

In the weaker model the attacker is presumed to have access to copies of the server's persistent data, but is unable to interfere with the operation of a running server.

In the strong model, a method must maintain security of the password even in the face of total active compromise of up to all but one of the authentication servers. The attacker is presumed to be able to modify server software and access all information available to a server while authenticating valid users. The strong model is simpler, and is thus preferred. It is also stronger than earlier models for similar systems that presumed the existence of prior secure channels.

In all of these models, each server may defend itself from unconstrained on-line attack by enforcing limits on the number of allowable invalid access attempts. These limits may be enforced in a number of usual ways. A preferred embodiment of the present invention also includes a feature that helps servers to better account for legitimate mistakes made in password entry.

The goal of a roaming system is to permit mobile users to securely access and use their private keys to perform public-key cryptographic operations. Mobility is referred to in a broad sense and encompasses acts of using personal workstation, and other people's workstations, without having to store keys there, using public kiosk terminals, as well as using modem handheld wireless network devices. It is desired to provide users password-authenticated access to private keys from anywhere, while minimizing opportunities for an enemy to steal or crack the password and thereby obtain these keys.

Smartcards have promised to solve the private key storage problem for roaming users, but this solution requires deployment of cards and installation of card readers. The tendency for people to sacrifice security for convenience has proved to be a barrier to widespread use of solutions requiring extra hardware. This is one motivation for software-based roaming protocols.

As used herein, a roaming protocol refers to a secure password-based protocol for remote retrieval of a private key from one or more credentials servers. Using just an easily memorized password, and no other stored user credentials, the user authenticates to a credentials server and retrieves her private key for temporary use on any acceptable client machine. The client uses the key for one or more transactions, and then afterwards, erases the key and any local password-related data.

As used herein, a client machine operating on behalf of a specific user is referred to as Alice and the credentials servers are generally referred to as Bob, or individually as $B_i$, using gender-specific pronouns for the female client and her male servers.

The concept of "roaming" systems is closely related to credentials servers. The SPX LEAF system disclosed by J. Tardo and K. Alagappan in "SPX: Global Authentication Using Public Key Certificates", Proc. 1991 IEEE Computer Society Symposium on Security and Privacy, 1991, pp. 232–244 presents a roaming protocol that uses a server-authenticated channel to transmit a password to a credentials server for verification, and performs subsequent retrieval and decryption of the user's private key. The credentials server protects itself by limiting guessing attacks that it can detect, and the protocol prevents unobtrusive guessing of the password off-line.

When a credentials (authentication) server can determine whether a password guess is correct, it can prevent or delay further exchanges after a preset failure threshold.

Password-only protocols are another important related field. The EKE protocols disclosed by S. Bellovin and M. Merritt in "Encrypted Key Exchange: Password-based protocols secure against dictionary attacks", *Proceedings of the IEEE Symposium on Research in Security and Privacy*, May 1992 introduced the concept of a secure password-only protocol, by safely authenticating a password over an insecure network with no prior act of server authentication required. A series of other methods with similar goals were developed, including "secret public key" methods disclosed by L. Gong, T. M. A. Lomas, R. M. Needham, and J. H. Saltzer in "Protecting Poorly Chosen Secrets from Guessing Attacks", *IEEE Journal on Selected Areas in Communications*, vol. 11, no. 5, June 1993, pp. 648–656 and by L. Gong in "Increasing Availability and Security of an Authentication Service", *IEEE Journal on Selected Areas in Communications*, vol. 11, no. 5, June 1993, pp. 657–662, the SPEKE method discussed by D. Jablon in "Strong password-only authenticated key exchange", *ACM Computer Communications Review*, vol. 26, no. 5, October 1996, pp. 5–26, http://www.IntegritySciences.com/links.html\#Jab96, the OKE method described by S. Lucks in "Open Key Exchange: How to Defeat Dictionary Attacks Without Encrypting Public Keys", The Security Protocol Workshop '97, Ecole Normale Superieure, April 7–9, 1997, the SRP-3 method described by T. Wu in "The Secure Remote Password Protocol," *Proceedings of 1998 Network and Distributed System Security Symposium*, Internet Society, January 1998, pp. 97–111. and others, with a growing body of theoretical work in the password-only model such as are disclosed by S. Halevi and H. Krawczyk in "Public-key cryptography and password protocols", *Proceedings of the Fifth ACM Conference on Computer and Communications Security*, 1998, M. K. Boyarsky in "Public-Key Cryptography and Password Protocols: The Multi-User Case", Proc. 6th ACM Conference on Computer and Communications Security, Nov. 1–4, 1999, Singapore, V. Boyko, P. MacKenzie and S. Patel in "Provably Secure Password Authenticated Key Exchange Using Diffie-Hellman", Advances in Cryptology—EUROCRYPT 2000, Lecture Notes in Computer Science, vol. 1807, Springer-Verlag, May 2000, and M. Bellare, D. Pointcheval and P. Rogaway in "Authenticated Key Exchange Secure Against Dictionary Attack", Advances in Cryptology—EUROCRYPT 2000, Lecture Notes in Computer Science, vol. 1807, pp. 139–155, Springer-Verlag, May 2000. Most of these papers stress the point that passwords and related memorized secrets must be conservatively presumed to be either crackable by brute-force or, at best, to be of indeterminate entropy, and this warrants extra measures to protect users.

The SPEKE method developed by the assignee of the present invention is an authenticated form of the well-known Diffie-Hellman (DH) exponential key exchange, where the base of the exchange is determined by a password. In a commonly used form of SPEKE, the password provides for mutual authentication of the derived Diffie-Hellman session key. Variations of SPEKE have also been described in pending U.S. patent application Ser. No. 08/823,961, and in a paper by D. Jablon entitled "Extended Password Protocols Immune to Dictionary Attack", *Proceedings of the Sixth Workshops on Enabling Technologies: Infrastructure for Collaborative Enterprises* (WET-ICE '97) *Enterprise Security Workshop, IEEE Computer Society*, Jun. 18–20, 1997, pp. 248–255, and in a paper by R. Perlman and C. Kaufman, "Secure Password-Based Protocol for Downloading a Private Key", *Proceedings of 1999 Network and Distributed System Security Symposium*, Internet Society, Feb. 3–5 1999.

A SPEKE-enabled system that uses split keys among multiple machines, herein referred to as SK1, was presented by D. Jablon on Jan. 21, 1999 at a talk entitled "Secret Public Keys and Passwords" at the 1999 RSA Data Security Conference 99, with slides published at <http//www.IntegritySciences.com/rsa99/index.html>. In this system, Alice's private key U is split into three shares, a password-derived share P, and two large shares X and Y. The shares are combined using the $\oplus$ function (bitwise exclusive-or) with U=P $\oplus$X$\oplus$Y. The SK1 enrollment and key retrieval processes are summarized below.

In SK1 enrollment, Alice selects the three shares {P,X,Y }, combines two of the shares to create a secret private key S (where S=P$\oplus$X), memorizes P, and stores X on her machine. Then, using a form of the B-SPEKE protocol, of which several other forms are described in the June, 1997 Jablon paper, she constructs a verifier {g,V} corresponding to the password-derived values {P,S } as follows: g=hash(S) using a cryptographic hash function, and V=P using exponentiation in an appropriate group. She then sends {g,V,Y} to Bob, who stores them as her secrets.

In SK1 key retrieval, Alice (at some later time) obtains her private key U from Bob. Alice uses the B-SPEKE protocol to prove her knowledge of P and S to Bob, and to negotiate an authenticated session key K with Bob. After Bob verifies Alice, using his knowledge of {g,V}, he sends her Y symmetrically encrypted under K. Alice then decrypts to retrieve Y and re-constructs U. A brute force attack on the password-derived value P in this system requires the attacker to have access to both shares X and Y, which are stored on two different machines.

| | |
|---|---|
| A: | S = P $\oplus$ X |
| A: | g = hash(S) |

-continued

| | |
|---|---|
| A→B: | A, $Q_A = g^{2R_A}$ |
| B→A: | $Q_B = g^{2R_B}$ |
| A: | $K_1 = Q_B^{R_A}$ |
| A: | $K_2 = Q_B^{P}$ |
| B: | $K_1 = Q_B^{R_A}$ |
| B: | $K_1 = V^{2R_B}$ |
| A→B: | hash(hash( $K_1$, $K_2$ )) |
| B→A: | encrypt(K, Y) |
| A: | $U = P \oplus X \oplus Y$ |

To enable a brute force attack on P in SK1, the attacker needs access to both X and Y.

The roaming model and password-only methods were combined in the Perlman and Kaufman paper to create protocols based on both EKE and SPEKE. These authors showed that simple forms of password-only methods were sufficient for secure roaming access to credentials. Other roaming protocols are discussed in the Gong, Lomas, Needham, and Saltzer papers, the Wu paper, the S. Halevi and H. Krawczyk paper "Public-key cryptography and password protocols", *Proceedings of the Fifth ACM Conference on Computer and Communications Security*, 1998, and the P. MacKenzie and R. Swaminathan paper "Secure Network Authentication with Password Identification", submission to IEEE P1363 working group, http://grouper.ieee.org/groups/1363/, Jul. 30, 1999, all of which are designed to stop off-line guessing attacks on network messages, to provide strong software-based protection when client-storage of keys is impractical.

Modified Diffie-Hellman is a method described by Eric Hughes in a paper entitled "An encrypted Key Transmission Protocol", presented at a session of CRYPTO '94, August 1994, and in a book entitled "Applied Cryptography Second Edition" by B. Schneier, published by John Wiley & Sons, 1996, at page 515. In ordinary Diffie-Hellman, both client and server know a fixed g, and jointly negotiate $K=g^{xy}$. However, in modified Diffie-Hellman, the client (Alice) sends $g^x$, receives $g^{xy}$, and retrieves $K=g^y$ from a server. Her secret exponent x is used as a blinding factor. The key is retrieved by raising the server's value to the power of x inverted, as in $K:=(g^{xy})^{1/x}$. Unlike the ordinary Diffie-Hellman method, a static value for K can be precomputed, even before the server receives the client's (Alice's) $g^x$.

A form of SPEKE that is based on Modified Diffie-Hellman, herein referred to as Modified SPEKE, is described in U.S. patent application Ser. No. 08/823,961. In Modified SPEKE, Alice derives a key K that is based on her knowledge of P, a value derived from her password, and a random value y known to Bob. Alice raises the password to a secret random power x, and sends the resulting value ($Q_A$) to Bob. Bob raises $Q_A$ to the power y, and returns the result ($Q_A$) to Alice. Alice computes K by raising $Q_B$ to the power of the inverse of x, with the result that $K=P^y$.

| Alice | | Bob |
|---|---|---|
| $Q_A := P^x$ | → | |
| | ← | $Q_B := Q_A^y$ |
| $K := Q_B^{(1/x)}$ | | |

It is recommended that P be a cryptographic hash function of the password, such as SHA1 or MD5, that results in a generator of a suitable large finite group. Further details may be found in U.S. patent application Ser. No. 08/823,961 and in the other papers on SPEKE.

To distribute the risk of stolen verification data, the data can be split among multiple machines. Care must be taken in the design of a network protocol that uses multiple machines to avoid exposing new avenues of attack on the password-derived data.

Another approach to a system that protects dictionary attacks is a technique called cryptographic camouflage (herein referred to as CC), as discussed by D. Hoover & B. Kausik in "Software Smart Cards via Cryptographic Camoflauge", *Proceedings of* 1999 *IEEE Symposium on Security and Privacy*. The CC system was introduced to reduce the vulnerability of client-stored private keys, in contrast with the present goal to reduce the vulnerability of server-stored verification data.

At least one CC system has been modified to support roaming users, which provides a two-server roaming solution. Before the two-server roaming version is discussed, the basic CC system will be discussed, which includes a user, a client machine, and a CC authentication server (CCAS).

CC uses public key techniques in a way that apparently violates some of the principles of public key technology, but with a set of restrictions designed to achieve the goals discussed in the Hoover and Kausik paper. The terminology "CC private key" and "CC public key" are used to designate two components of the system.

Note that the use of "private" and "public" in the terms "CC private key" and "CC public key" have a special meaning that is not consistent with the ordinary use of the terms "private key" and "public key". In particular, the CC model presumes that the CC public key is not publicly known.

The CC private key is stored on the client, but in a way that is hidden with a small personal identification number (PIN). It uses a special construction that makes decryption of the stored private key with any possible PIN equally plausible. (This issue is discussed later when considering human-chosen versus machine-generated PINs, an enemy's partial knowledge of PINs, and related threats.)

Only trusted parties must know the CC public key. If a CC-encrypted private key is stolen, possession of the CC public key gives the thief the ability to mount a dictionary attack on the PIN. To meet the security goals, the CC public key must be known only to the CCAS. In practice, the client may store the CC public key in a form encrypted under the CCAS public key, such that only the CCAS can read it. The client sends this encrypted package to the CCAS whenever it authenticates to the CCAS.

Similarly, any digital signatures that were signed with a user's CC private key must be visible only to the CCAS. Thus, messages are first signed with the CC private key, and then sealed with the CCAS public key.

Note that Hoover and Kausik state a more liberal restriction, that any messages encrypted under the CC private key containing verifiable plaintext must be known only by the CCAS. It is noted that in practice it is exceedingly difficult to create useful messages that are free from verifiable plaintext. The presumption that plaintext is not verifiable leaves open questions about the security of the system that depends on the ingenuity of the attacker to create a suitable verification method. Open questions such as these are not acceptable in the present model, hence a tighter statement of this restriction is used. Following is a summary of the CC system:

In CC enrollment, the client chooses PIN P, private key $E_C$, and corresponding public key $D_C$. There are also further restrictions that CC imposes on the construction of EC and $D_C$, that need not concern us here. The client stores:

$CC(P, E_C)$ the camouflaged private key
    $D_S$ the public key of the CCAS
    $D_S(D_C)$ the client public key sealed for the CCAS In CC authentication, the user enters P, and the client retrieves $E_C$ from $CC(P, E_C)$. The client sends to the CCAS:

$D_S(E_C(message))$, and
    $D_S(D_C)$.

The CCAS unseals both $E_C(message)$ and $D_C$, and verifies the client's signature to authenticate the message.

One might presume that $D_C$ is accompanied by a suitable set of certificates that attest to the validity of the key for the purposes of the CCAS. Yet, given that $D_C$ must be remain a secret shared by the client and the CCAS, this would seem to preclude ordinary methods for certifying $D_C$ using third-party certificate authorities. Together these restrictions on the CC private key and CC public key make it clear that these are unsuitable for use in any true public key system.

In CC, the PIN is effectively divided into two shares,
    $CC(P,E_C)$ which is known only to the client, and
    $D_C$ which is known only to the server.

In general, all further messages signed under $E_C$ or sealed under $D_C$ must also be sealed under $D_S$. In accordance with the present invention, this can be transformed into a two-server roaming solution.

The CC system handles password entry errors in a special way, with a feature that detects typographical errors in password entry on the client. The client compares a small amount of the hashed password against a locally stored reference data on the client. However, this mechanism has a significant cost, in that it leaks a few bits of information about the password to an enemy that gets access to the stored client data. The consequence is that passwords in the CC system must be somewhat larger or more complex, and thus harder to memorize, for a given level of security against on-line guessing attacks. The CC error handling feature was designed with the premise that people can work a little harder to ease the computing burden on the system, in that early detection of errors on the client prevents unnecessary work on the server. An alternative philosophy is that computers should be used to save people from having to work. Systems should work hard to tolerate user mistakes, without penalizing the user, and still maintain the highest possible barrier against password guessing attack. A system for optimally handling innocent mistakes in password entry is included in a preferred embodiment of the present invention.

Roaming solutions have been designed and deployed by a number of companies that provide public key infrastructure (PKI), for the purpose of authenticating "roaming" users, principally where smart-cards are unavailable. In such systems users securely retrieve stored user profiles (typically containing user private key) from a remote credentials server discussed by J. Kerstetter, "Entrust, VeriSign clear path to PKI", PC Week, Jun. 14, 1999, available at <http://www.integritysciences.com/PKI50.html>. Other work on credentials servers use variants of EKE and SPEKE as described in the Perlman and Kaufman paper.

The cryptographic camouflage system described above presumes a single CC server, and presumes user key information is stored on the client. One can transform this into a two-server roaming solution, which is referred to as CC Roaming, by moving the client stored data to a CC roaming server (CCRS) and giving the CCRS an additional verification data for a second user password.

The user authenticates to the CCRS using a password, and an appropriate password-authentication protocol that results in the ability for the CCRS to securely return information to the client. Preferably, this would use a verifier-based or so-called "extended" zero-knowledge password protocol. However, alternative constructions are possible, including sending the clear-text password through a server-authenticated SSL (secure socket layer) or TLS channel to the CCRS for verification. SSL is discussed by A. Frier, P. Karlton, and P. Kocher in "The SSL 3.0 Protocol", Netscape Communications Corp., Nov. 18, 1996, and TLS is discussed by T. Dierks and C. Allen in "The TLS Protocol Version 1.0", IETF RFC 2246, http://www.ietf.org/rfc/rfc2246.txt, Internet Activities Board, January 1999. As discussed above, for full security, the CCAS PIN and the CCRS password must be chosen to as completely independent values. If they are related values, an attack on the password may lead to disclosure of the PIN.

In essence, CC Roaming is a two-password system, with one password for the CCRS, and another (the PIN) for the CCAS. One obvious limitation of CC Roaming is that the first server gets the opportunity to mount a brute-force attack on the first password. Two other related issues are the efficiency of using client entropy, and the independence of the PIN and password.

When using CC Roaming with password-thru-SSL to authenticate to the CCRS, there are added risks both from server-spoofing attacks, as discussed by E. Felton, D. Balfanz, D. Dean and D. Wallach in "Web Spoofing: An Internet Con Game", 20th National Information Systems Security Conference, Oct. 7–10, 1997, Baltimore, Md., and at http://www.cs.princenton.edu/sip/pub/spoofing.html, and from related password/PIN attacks described below. In all of these cases, it is possible to lose some of the benefits of the two-server approach if just one of them gets attacked. Using a zero-knowledge password-proof to authenticate to the CCRS can eliminate the server-spoofing attacks, and make related PIN/password attacks much more difficult.

The CC roaming system makes inefficient use of the entropy inherent in user passwords, which must be considered to be a valuable and scarce resource. Recall that a primary goal of password methods is to minimize the amount (number of significant bits) of information that a user must remember to achieve a given level of security. The CC Roaming system wastes these bits and introduces several points of vulnerability. First, Hoover and Kausik suggests using some bits of the PIN to pre-qualify the PIN before running the protocol. They do this by additionally storing a specially constructed small hash of the PIN in the client. An attacker can use the hashed PIN to reduce the space of candidate PIN's. Considering the already reduced size of the PIN, this is may be dangerous. If user-chosen PINs are allowed, this may reduce the space of valid PINs to a dangerous level.

A CC Roaming system may also be sensitive to the relationship between two passwords, the AS PIN and the RS passwords, which artificially divides the entropy of the user's secrets. Hoover and Kausik make it clear that the camouflaged AS PIN must not be used for any other purposes. Yet, if the user accidentally incorporates the AS PIN in the RS password, or if there is some correspondence between these secrets that might be known to an attacker, the underlying CC system in CC Roaming becomes vulnerable to attack.

A related password/PIN attack is possible when the user chooses them as the same values, or as distinct values with an obvious or perhaps subtle-but-discernable relationship. There is also a risk for a user with truly independent PIN and password who mistakenly types one in place of the other.

If one considers broad-based attacks on multiple users, one can reduce the target space by first cracking the users with weak RS passwords, and then focus the effort on the set of cracked RS users to crack their corresponding AS PINs. This leakage of information about the RS password can reduces the overall work for a potential attacker. In contrast, if the same RS passwords and AS PINs are combined, an ideal two-server system (which will be described) has a cracking work factor that depends on both the passwords and the PINs, requiring a much larger overall work factor.

The artificial partitioning of the secret into two factors for the CC Roaming system thus introduces new vulnerabilities and weakens the model. In the description of the preferred embodiments, simpler alternatives to CC and CC Roaming are described that are more powerful, less complex, and at least equally protective of the user's memorized secrets.

All single-server roaming solutions have inherent limitations. In all of the above roaming methods, a single credentials server maintains data that could be used to verify information about a user password. If it is presumed that hashed-passwords can be broken by brute-force, the password-verifying server essentially represents a single point of failure for this sensitive user data. Systems that address this problem will now be discussed.

Multi-server roaming represents a further advance. While single server systems prevent guessing attacks from the client and the network, they do not stop guessing based on password-verification data that might be stolen from the server. Multi-server roaming systems can prevent such attacks to an amazing degree. At the cost of using n related credentials servers to authenticate, multi-server systems extend the scope of protection to the credentials server database. In these systems, an enemy can take full control of up to n−1 servers, and monitor the operation of these servers during successful credential retrieval with valid users, and still not be able to verify a single guess for anyone's password, without being detected by the remaining uncompromised server.

In June 2000, VeriSign issued a press release entitled "VeriSign Introduces New Technology to Enable Network-Based Authentication, Digital Signatures and Data Privacy" in May 2000, and published a web page located at http://www.verisign.com/rsc/wp/roaming/index.html that described, at a high level, a multi-server roaming feature. A paper by W. Ford and B. Kaliski entitled "Server-Assisted Generation of a Strong Secret from a Password" was presented at the IEEE *Ninth International Workshops on Enabling Technologies: Infrastructure for Collaborative Enterprises* in Gaithersburg Md., on Jun. 14, 2000. A revised version of this paper was published in the proceedings in September 2000 (W. Ford and B. Kaliski, "Server-Assisted Generation of a Strong Secret from a Password", Proceedings of $9^{th}$ International Workshops on Enabling Technologies: Infrastructure for Collaborative Enterprises, IEEE, September, 2000). These papers describe methods that use multiple servers to frustrate server-based password cracking attacks. It is noted that the methods detailed in the Jun. 14, 2000 Ford & Kaliski paper rely on a prior server-authenticated channel. This dependency on a prior secure channel for password security introduces an unnecessary and potentially risky security assumptions. The removal of this dependency is one of the advantages of the present invention.

One of the methods disclosed in the Jun. 14, 2000 paper uses the Modified SPEKE protocol, as described above, which is used in a preferred embodiment of the present invention. In the various methods described in the Jun. 14, 2000 paper, two or more servers share the burden of keeping the password verification data secret. Each server stores a secret, for the user. A client obtains the password from the user and interacts with each server in a two-step process. First the client obtains an amplified key based on the password from each server, and then creates a "master" key that is used to authenticate to each of the servers. (Note that the term "amplified key" (which comes from the Bellovin and Merritt, paper) is used herein instead of the "hardened key" terminology of Ford and Kaliski.) Each amplified key represents one share of the user's master key. The client uses any standard technique, such as the use of a hash function, to combine the amplified key shares to create the master key.

To obtain each amplified key, Ford and Kaliski suggest two basic methods. One is the Modified SPEKE method described above, and the other is a variant that uses blind RSA digital signatures in the style described by D. Chaum in "Security without Identification: Transaction Systems to Make Big Brother Obsolete", *Communications of the ACM*, 28 (1985), 1030–1044. These methods are compared below.

The servers keep track of invalid access attempts, and, according to Ford and Kaliski, if there are "significantly more" steps of password amplification than there are successful authentications, the server takes action to limit or lockout further requests. The system however does not distinguish between mistakes made by a valid user, and other events that might better reflect a true attack on the password. As such, their system for dealing with unsuccessful attempts here doesn't optimally handle common human errors. Unsuccessful amplifications due to simple typographical errors or other corrected mistakes should not be counted as other unsuccessful attempts. The present invention provides a better way to deal with these cases.

The methods in the Jun. 14, 2000 paper further rely on previously secured server-authenticated channels to the servers. This reliance on prior authentication creates an unnecessarily complex security model, and thus has added risks of attack. These risks may be incompatible with the goal of eliminating single points of failure.

RSA blind public-key signatures are used in one of the password amplification methods described the Jun. 14, 2000 paper. This technique accomplishes the same effect as the Modified SPEKE method—both amplifying a password into a large key based on a random component known to another party. However, the RSA method introduces added complexity. Details of the RSA blinding method are not included in the Ford and Kaliski papers, but a method based on their reference to Chaum-blinding appears to work as follows.

Instead of a single value y, the server maintains for each user the values {n, e, y}. None of these values are derived from the password. The value n is equal to p·q, where p and q are prime numbers suitable for an RSA modulus, e is the RSA public key and y is the corresponding private key, such that e=1/d mod (p−1)(q−1). Essentially, the amplified key is $K_B$, which is an RSA signature on the password. The use of x makes this a blind public-key signature scheme as described in the Chaum paper, where the blinding factor x prevents the server from knowing the data (P) that it is signing.

In the Jun. 14, 2000 paper it is proposed that SSL be used to authenticate the channel to insure the authenticity of $K_B$ for the client. The paper also notes an advantage of Modified SPEKE over RSA blinding, in that the RSA blinding client has no good (i.e. efficient) way to validate the values of n and e, other than by pre-authenticating the server.

Ford and Kaliski further present a "special case" protocol, where a "password hardening server" is used to amplify a password into a key $K_1$ that is used to authenticate to a (conventional) credentials server. The value of $K_1$ is completely determined by the password hardening server's response and the password. Any attacker who controls the first exchange must be unable to determine whether the $K_1$ value computed by the user is equal to candidate $K_1'$ values that he constructs based on his guesses for P'. So the attacker must never see $K_1$. Similarly, if a message encrypted with $K_1$ contained verifiable plaintext, the attacker could validate guesses from that as well. To counter this threat, the authors suggest that the credentials server communication channel be integrity protected. The Jun. 14, 2000 paper does not specify an explicit method, but it suggests the use of SSL. (Note that their September, 2000 paper does discuss how to avoid the need for a pre-secured channel.) If it is presumed that a common set of root certificates in the client can validate both servers, one or more single points of failure are introduced into the system. There is a single point of failure at each location where a private key resides for the root or any subordinate certificate authority. This is significant, as a primary goal of this model is to eliminate single points of failure.

The aforementioned attack can be achieved by compromising any single system that has a key to create a valid-looking certificate chain for the two servers in question. Furthermore, as described above, an attack on the SSL/web browser model of security can trick the user into using "valid" SSL connections to malicious servers, or into not using SSL at all.

Dependency on prior server authentication is a serious limitation. In a consumer environment, such as a public kiosk, or a private desktop that can connect to a wide variety of servers in different domains, the user must locate and connect to the appropriate server. The dependency on users to securely connect to the appropriate server, to maintain security of the password, introduces problems. Ford and Kaliski discuss how the client can use SSL to create a secure server-authenticated channel. This implies that the client must (somehow) validate the identity of the server to maintain password security. It also implies, in typical implementations, that the client stores server-specific state information to authenticate the communication channel to the server. To establish a secure channel to the server, an SSL solution typically requires having a pre-installed root key for one or more certificate authorities that are installed in the client. It also requires access to a chain of certificates that have been constructed that associate the root key with the public key of the named server. The client must include certificate validation software and policy enforcement to validate a certificate of the appropriate server (or servers) selected by the user. Ultimately, the user must insure that the server name binding is correct. This may require significant action and attention by the user. A reliance on SSL, especially as used in the browser model, is unnecessarily risky. The user can be tricked into using "valid" SSL connections to malicious servers, or tricked into not using SSL at all. This process is subject to several types of failure that might be attributed to "human error". The problem is believed to be an overall system design error based on unrealistic expectations of the human participant.

The dependency on a prior server-authenticated channel for password security is unnecessary. Preferred alternative methods of the present invention work in a simpler model that is better adapted to normal human behavior in an environment of multiple roaming users and multiple servers.

The preferred security model is similar to that in the Jun. 14, 2000 paper, in that both use multiple servers. However, in the preferred model of the present invention, it is not presumed that a pre-authenticated secure channel exists between the client and servers. The preferred model frees users from having to carefully validate the identity of the server in order to maintain security of the password. In this model the user is free to locate the server, casually, through any insecure mechanism, such as those commonly used on the Internet. These methods include manually typed (or mistyped) URLs, insecure DNS protocols, untrustworthy search engines, "clicking" on items in a collections gathered by an unknown source. All of these methods and more provide a robust multitude of ways to establish a connection to the right server, but none of these have to guarantee against the chance of connecting to an imposter. The worst threat posed in this simple model is one of denial of service—which is a threat that is always present anyway in the more complex model. The added benefit of the preferred model is that the password is never exposed, even when the client is connected to an imposter, by whatever means.

Most of the prior art handles erroneous password entry very simply. In the Jun. 14, 2000 paper, it is suggested that each server can keep track of the number of "password hardening" steps, and to reconcile this with the number of successful authentications. If there are "significantly more" hardenings than authentications, then the account would be locked out. This is typical for password-based systems. However, it is noted that unsuccessful logins may be quite common. Passwords are frequently mistyped, and users may often enter the wrong choice of multiple passwords, before finally getting it right. If a long-term fixed limit is place on such mistakes, valid clumsy users might be locked out. On the other hand, if the system tolerates a three-to-one attempt-to-success ratio, an occasional guessing attack by an enemy over the long term might remain undetected.

To address this error handling problem, the concept of "forgiveness" is introduced in the present invention. A system should be forgiving, and not account for transient mistakes by a valid user in the same way as invalid access attempts by unknown users. This problem is addressed in preferred embodiments of the present invention.

It is therefore an objective of the present invention is to reduce the threat of server-based attack as much as possible in a simple security model in a password-based client/server authentication system. It is also an objective of the present invention to provide for remote user authentication using multiple servers. It is also an objective of the present invention to authenticate from a client to a server using just a small password. It is also an objective of the present invention to provide for authentication that does not require stored keys or certificates on a client machine. It is also an objective of the present invention to use multiple servers for fault-tolerance. It is also an objective of the present invention to provide for remote password authentication that is secure even with total active compromise of any individual server. It is also an objective of the present invention to better handle common human errors in password entry.

SUMMARY OF THE INVENTION

To accomplish the above and other objectives, the present invention provides for systems, methods and software that implement remote password authentication using multiple servers. The systems, methods and software employ a form of Modified SPEKE to implement security in a multiple-server system.

An exemplary system in accordance with the present invention comprises one or more clients and a plurality of authentication servers coupled together by way of a network. In the exemplary system, a client uses Modified SPEKE to retrieve a share $K_i$ of a secret master key from each authentication server, where i is a variable that designates the specific server. The client combines the respective shares from each of the servers to create the master key $K_m$, which is used to authenticate to the servers, and to retrieve and decrypt sensitive data (including her private key) that is stored securely on the servers or elsewhere.

Each authentication server individually knows a random value $y_i$ that corresponds to a single share of the master key. Each authentication server is also responsible for maintaining a list of recent access requests from clients, and reconciling these access attempts by verifying proof messages received from valid clients. In particular, each server must forgive a valid user for recent past errors in password entry, when it can verify a valid request for forgiveness.

To prevent the possibility that an enemy in control of the communications channel can trick Alice into using an improper master key $K_m$, Alice confirms that $K_m$ is correct before using it to create any data that might be revealed to the enemy. The authentication step uses a signed message from Alice to each server to authenticate valid logins, as well as authenticating and requesting forgiveness for prior recent legitimate-but-mistaken login attempts.

More specifically, at enrollment time, Alice creates n shares of a master symmetric key $K_m$ where each $i^{th}$ share $S_i$ is formed as a function of her password P raised to a random exponent $y_i$. The shares are combined with a function such that an attacker who has knowledge of any proper subset of shares cannot distinguish $K_m$ from a random value in the same range. Alice then somehow conveys each exponent $y_i$ to be stored as a closely guarded secret by the $i^{th}$ server. Alice also selects a public/private key pair $\{V,U\}$ for digital signatures, and symmetrically encrypts private key U using a key derived from $K_m$ to create her encrypted private key $U_K$. Finally, Alice creates a proof value $proof_{PKm}$ that links the password to her master key. Alice sends V to each of the n servers, and stores $U_K$ and $proof_{PKm}$ in a convenient place, perhaps on each of the servers. The enroll protocol flow is performed through a secure channel that authenticates the identity of Alice, A, to each $i^{th}$ server $B_i$.

Client:$\{enroll,A,V,y_i\} \rightarrow B_i$

Client:$\{record,A,U_{Km}, proof_{PKm}\} \rightarrow B_i$

At key retrieval time, in order for Alice to reconstitute her master key and retrieve her private key, Alice sends a randomly blinded form of the password Q to each server. Each server in turn responds with a blinded reply $R_i$ consisting of the blinded password raised to power of the secret exponent value ($R_i := Q^{y_i}$) which represents a blinded share of the user's master key. At least one of the server's also sends Alice her encrypted private signature key $U_K$ and $proof_{PKm}$.

Client:$\{request,Q\} \rightarrow B_i$

Server $B_i$:$\{reply,Q^{y_i},U_K, proof_{PKm}\} \rightarrow$ Client

Interestingly, the channel though which Alice retrieves $U_K$ and $proof_{PKm}$ does not have to guarantee the integrity of these values. This is discussed further in Section 4.4.

Alice unblinds each reply to obtain each key share and combines the shares to rebuild her master key $K_m$. She then verifies that the master key is correct using the proof value $proof_{PKm}$ and her password P. If the proof is incorrect, this implies that at least one of the key shares is incorrect, and she must abort the protocol without revealing any further information about $K_m$ or P to the network. Otherwise, a key derived from $K_m$ is used to decrypt her encrypted private key (and any other data), and then she completes the protocol by proving her identity to each server. For each blinded password Q recently sent to each server, she sends a signed copy of the blinded password.

Client:$\{confirm,Q_1,sign(U,Q_1)\} \rightarrow B_i$

Client:$\{confirm,Q_2,sign(U,Q_2)\} \rightarrow B_i$

Each server matches the signed $Q_x$ values from Alice against its list of recently received blinded passwords, and removes any matching entries that are accompanied by valid signatures. The remaining entries, if not confirmed within a reasonable amount of time, are considered to be suspected illegal access attempts, which are labeled bad. Counting bad access attempts may be used to limit or delay further blinded share replies for the user's account if the counts rise above certain thresholds.

Alice must verify her master key. As mentioned above, Alice can perform the authentication over insecure channels. She retrieves (typically from a credentials server) her verifier $proof_{PKm}$, and then confirms the validity of the reconstructed master key by comparing a keyed hash of her password with it to $proof_{PKm}$. If the values don't match, Alice aborts the protocol.

Another enhancement of our method relates to how Alice proves knowledge of the master key to each server, and how each server reconciles this information with its own record of access attempts.

Each server detects illegal access attempts by looking for a message from Alice that contains a proof of her knowledge of the master key, and by implication, proof that she knows her password. If a valid proof is not associated with the blinded password value, the server must trigger a bad access event for Alice's account. The present method is different from prior art in the construction of Alice's proof and how each server uses the proof to forgive Alice's mistakes in password entry.

When not using a secure channel, simply sending proof to $B_i$ could expose the method to a replay attack. To prevent this, the proof incorporates the blinded request value that is sent by Alice. Furthermore, it is recognized that Alice occasionally mis-types her password, and she is not penalized by incrementing her illegal access count, which might cause premature account lockout. It is desired that each server forgive her mistakes, when she can subsequently prove to the server that she ultimately was able to enter the correct password.

Using the forgiveness protocol, a user's honest mistakes are forgiven. Alice sends evidence of her recent prior invalid access attempts in a request for forgiveness after each successful authentication. Upon receiving and validating this evidence, each server erases the mistake from the record, or records the event as a corrected forgivable mistake. By fine-tuning a server's event log in this manner, a system administrator gets a more detailed view of when the system is truly at risk, as opposed to when valid users are merely being frustrated.

A forgiving system seems to require at least one signature generation step on the client and one signature verification step for each of the servers. To minimize computation (which may be important when a public-key signature method is used, due to the computational cost), the signature steps provide the combined functions of authenticating the user, and proving that the request came from that user. In constructing a valid authentication message for a user, the client includes the set of all recent challenge messages issued by that user, digitally signs the result with the appropriate user's key, and sends it to all servers. Each server verifies the signature to authenticate the user, and at the same time validate evidence of her recent forgivable mistakes. (These signatures may be created using a client's private key in a public-key digital signature system and verified using the client's public key, or alternately, using a keyed-MAC keyed by distinct symmetric keys that are bilaterally shared between the client and each server.)

Each server, upon receiving Alice's confirm message, attempts to reconcile the proof of her access attempts against his recorded list of recent attempts. He does this by verifying Alice's signature on each Q value. Upon successful verification, he knows that the Q value was indeed sent by someone who ultimately knew the password, regardless of whether that request message was specifically used to recreate her master key.

In a preferred embodiment of the present invention, vulnerability of the password verifier is spread among the servers so that no one server is able to crack the verifier. It provides for a system that scales to N servers, where no attack on any number of up to N−1 servers reveals a user's password, or any password-protected data. It provides strong assurance even in the face of total active compromise of up to all but one of the authentication servers, and in the face of prior insecure communication channels. It is to be understood that the password is the only factor in implementing the system.

It is to be understood that the password is the only authentication factor required in implementing the present invention. Password-only authentication is a dominant method in use today. In the present invention, the password factor is made as strong as possible, and is not dependent on other factors.

It is also to be understood that other additional keys or certificates may be used. It is envisioned that the present invention may be used in multi-factor systems. Clearly in non-roaming applications, where there is the ability to store local keys, one may do so to provide additional layers of strength. For example, the use of a secure socket layer (SSL) channel is not required for the security of passwords in the present system, but the additional use of SSL can provide other benefits, such as an increased level of privacy for a user's name when performing these transactions. By removing the dependency on such other factors for password security, the strength of the overall system is greatly increased. In particular, the present system stops an entire class of web-server spoofing attacks that are possible against a simplistic password-through-SSL system of web-browser authentication that is in widespread use today.

BRIEF DESCRIPTION OF THE DRAWINGS

The various features and advantages of the present invention may be more readily understood with reference to the following detailed description taken in conjunction with the accompanying drawing figures, wherein like reference numerals designate like structural elements, and in which:

FIG. 4 is a flow diagram illustrating an exemplary method in accordance with the principles of the present invention showing operation of a client with two servers; and FIG. 5 is a flow diagram illustrating an exemplary method in accordance with the principles of the present invention showing operation of a client communicating with only one of two servers.

DETAILED DESCRIPTION

Figure 1:
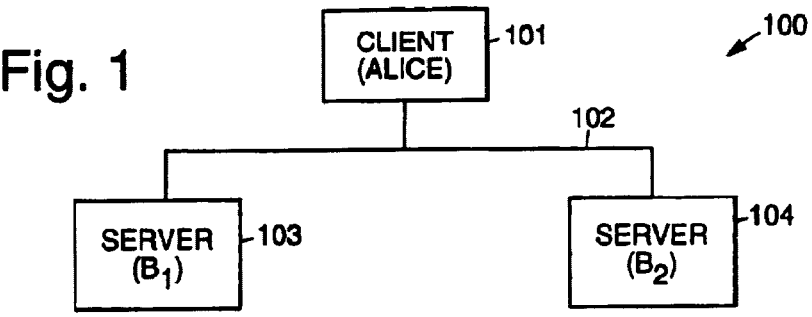
FIG. 1 is block diagram illustrating client and server components of an exemplary system in accordance with the principles of the present invention.

Referring to the drawing figures, FIG. 1 is block diagram illustrating an exemplary multiple-server system 100 in accordance with the principles of the present invention. The exemplary system 100 is shown as comprising a client 101 or client computer 101 (Alice) and a plurality of authentication servers 103, 104, in this instance two servers $B_1$ 103 and $B_2$ 104 coupled together by way of a network 102.

The present systems 100 and methods employ the Modified SPEKE method for a client 101 to retrieving shares of a master key from two or more servers 103, 104. (The number n is used to designate the number of servers 103, 104 used in a specific embodiment.) The model used in implementing the present invention permits authentication messages to be sent over an unprotected channel or network 102, and no secure channel (e.g. SSL) is required. To prevent the possibility that an enemy in control of the channel can trick Alice into using an improper master key, Alice confirms that the master key is correct before using it to create any data that might be revealed to the enemy. Furthermore, the authentication step uses a signed message to authenticate valid logins, as well as prior legitimate-but-mistaken logins, to accommodate the forgiveness protocol. Distinctive functions are provided to create the password-derived base element for the exponential exchange, and we describe forms that permit more flexible configurations of clients 101 and servers 103, 104. Alternative methods are provided in a weaker security model that may be valuable for specialized situations.

In the preferred embodiments, Alice's potentially small password and all her password-protected data remains secure even with total active compromise of up to n−1 servers 103, 104. Encryption of Alice's sensitive data under a key derived from $K_m$ insures that her data will be only available to parties that use the correct password with this authentication process.

At time of enrollment, Alice selects a password and a series of shares $\{y_1, y_2, \ldots y_n\}$ that are used to create master key $K_m$. In this example, the master key derivation function is $K_m$=hash($K_1 \| K_2 \| \ldots K_n$), with each share computed as $K_i = P^{y_i}$, although other alternative key derivation functions are described below. Alice precomputes $K_m$, and stores with each $B_i$ the corresponding key share $y_i$ and verification data for $K_m$. Verification data is generally a digitally signed message, using either a public-key digital signature or alternately a symmetric keyed-MAC function.

Each server $B_i$ provides Alice with a share $K_i$ using the Modified SPEKE protocol, based on his knowledge of $y_i$. Each run of the protocol retrieves one of her blinded key shares, which in this example is the value $m_i = P_{xy}^{\,i}$. Alice combines and hashes these shares to derive the master key, in this example using:

$$K_m = \text{hash}(m_1^{1/x} \| m_2^{1/x} \| \ldots m_n^{1/x})$$

Due to the random $y_i$ values, these key shares are independent.

Figure 2:
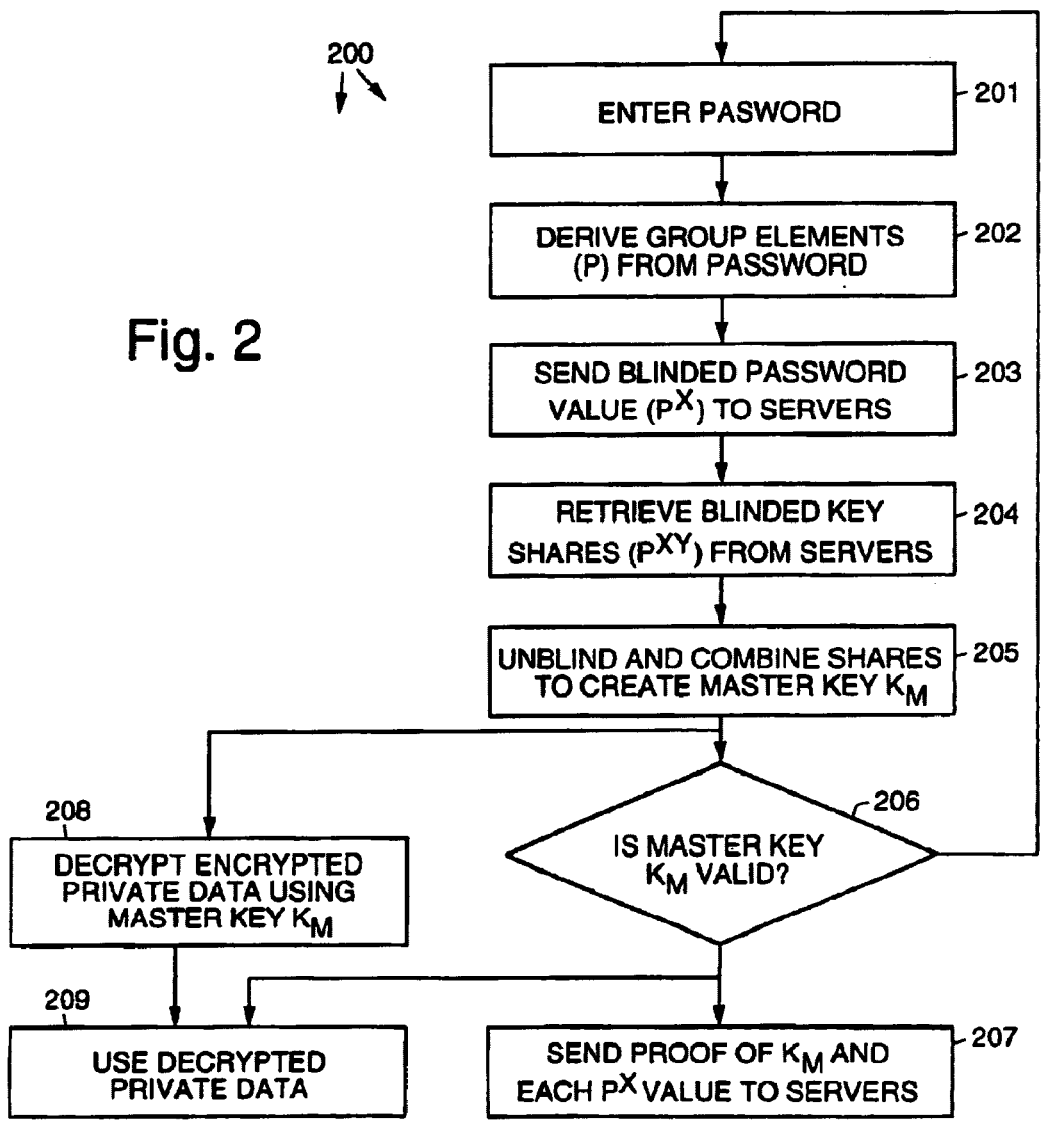
FIG. 2 is a flow diagram illustrating an exemplary method of client operations in accordance with the principles of the present invention.

Referring to FIG. 2, Alice retrieves the master key from the servers 103, 104 at a later time. The client 101 prompts the user to enter a password 201, and derives a group element from the password 202, in accordance with the Modified SPEKE method. (An example of such a function is $P = hash(password)^2 \mod p$, when using the large prime order subgroup of $Z_p^*$ with $(p-1)/2$ prime.) Using the Modified SPEKE method, Alice sends the blinded password value $P^x$ to each server $B_i$ 203. Each server $B_i$ raises the blinded password value to the appropriate power as in $m_i = (P^x)^{y_i}$, and returns the result to Alice. Alice retrieves the corresponding blinded value of each key share $m_i$ 204, and unblinds each result and combines them to create her master key 205, in this example with the function $K_m = hash(m_1^{y_1} \| m_2^{y_2} \| \ldots m_n^{y_n})$.

The general method for Alice to retrieve a key share $K_i$ from any server, which is generally labeled $B_i$, is shown here:

| | |
|---|---|
| A→$B_i$: | $m_0 = P^x$ |
| $B_i$→A: | $m_i = m_0^{y_i}$ |
| A: | $K_i = m_i^{1/x} = P^{y_i}$ |

The secret value $y_1$ that $B_1$ knows is completely independent from the value $y_2$ that $B_2$ knows, and so on. Thus, no one server has sufficient information to mount a dictionary attack on either $K_m$ or P. With this protocol, each $B_i$ prestores $y_i$, and also stores verification data V that is a one-way function of the master key $K_m$.

Alice can use $K_m$ to decrypt personal private data 208 that has been stored in an encrypted container using a key derived from $K_m$. This container might be stored on any of the servers 103, 104, or anywhere else that is convenient, and can be retrieved over insecure channels. However, before Alice reveals any data derived from her knowledge of $K_m$ to any other party, she must first determine that $K_m$ is valid 208. Specific validation techniques are discussed below.

If $K_m$ is not valid, then depending on local password retry policy, the user may be asked to try again with re-entering the password 201. If a retry is performed, the client 101 saves the $P^x$ value used in the failed exchange in secure short-term memory.

If $K_m$ is valid, then Alice constructs a proof of knowledge of $K_m$, of $P^x$, and of a list of any recent prior $P^x$ values generated by the same user that were stored in short-term memory, and sends 207 this proof to each of the servers 103, 104. Alice can also now freely use data derived from $K_m$, such as signing public documents with a private key that was stored in the encrypted container 209.

Alice can proves knowledge of $K_m$ to any $B_i$ using any appropriate zero-knowledge protocol, which does not have to be a zero-knowledge password protocol because $K_m$ has large entropy. Each server $B_i$ has verification data information V that corresponds to $K_m$ and that allows him to verify Alice's zero knowledge proof of $K_m$.

For example, in one embodiment, $K_m$ is used by Alice to retrieve the user's private key U for a public key digital signature scheme, where V is the user's public signing key that corresponds to U. Alice can prove knowledge of $K_m$ to $B_i$ in many ways, such as signing a message using the private key, where $B_i$ verifies the signature and which proves Alice's knowledge of $K_m$.

The derivation of U from $K_m$ can also be done in many ways. In one embodiment, the values of U and V can be derived directly from $K_m$ using no other data.

In a preferred embodiment of the present invention, the value of U is kept sealed in a container encrypted with a symmetric key derived from $K_m$. In this case, Alice uses $K_m$ to derive the symmetric encryption key and then unseals her private key U.

Alice then signs a message that is known by $B_i$, that proves her knowledge of $K_m$, and she sends the signed message to $B_i$. In one embodiment of the present invention, the message is a value $R_{Bi}$ sent from Bob to Alice.

| | |
|---|---|
| $B_i$→A: | $R_{Bi}$, a random one-time number. |
| A→$B_i$: | $U(R_{Bi})$, her signature of $R_{Bi}$. |

Alternatively, in the preferred embodiment of the present invention, Alice sends $U(Q_A)$, which further proves that she was the one to authenticate using $Q_A$. Why Alice should authenticate $Q_A$ is discussed below, and how it relates to each server's need to distinguish good from bad access attempts.

A third approach is where $V = g^{K_m}$, essentially a Diffie-Hellman public key for $K_m$. In this case Alice might authenticate as follows:

| | |
|---|---|
| $B_i$→A: | $g^x$ |
| A→$B_i$: | $m := hash((g^x)^{K_m})$ |
| $B_i$: | if $(m == V^x)$, then Alice must know $K_m$. |

Alice may then send $E_{Km}(Q_A)$ to prove herself.

In any case, when Alice proves knowledge of $K_m$, she is also proving knowledge of the password P.

There is good reason for not wanting server $B_i$ to know a single share $K_i$, since combined knowledge of $K_i$ and $y_i$ gives that server the ability to crack P. In the single server case, it seems inevitable that the server must store some data that can be used to crack the password. But in the ideal multi-server case, it is not desirable for the server to know either P, $K_m$, or $K_i$, or anything else that can lead to cracking P.

In summary, each $B_i$ does not know P or $K_i$. $B_i$ uses $y_i$ to run Modified SPEKE and authenticate Alice's knowledge of $K_m$. Each $B_i$ only knows $y_i$ and V, verification data for $K_m$, which also serves as verification data for $K_i$, or more broadly as verification data for Alice's knowledge of P.

Enrollment

At enrollment time, Alice chooses her password, and a public/private key pair $\{V,U\}$ suitable for performing public key digital signatures.

Alice performs the following steps offline:

Construct a group element P based on the password, as in:
  $P = hash(password)^2 \mod p$
For i = 1 to n servers 103,104
{
  Choose $y_i$ as an independent large random number
  Compute $K_i := P^{y_i} \mod p$
}
Compose K from all the $K_i$ shares, as in for example
  $K_m = hash(K_1 \| K_2 \| \ldots K_n)$
Construct universal verification data for master key $K_m$, as in for example:
  $V = g^{K_m} \mod p$.
Then Alice securely distributes these credentials to the n servers 103,104.

-continued

Let "UserID" be an identifier for the user.
For i = 1 to n servers
{
    store {UserID, $y_i$, V} on each server.
}

Authentication

Alice authenticates by retrieving each $K_i$ share using Modified SPEKE, combining the shares to create $K_m$, checking the validity of $K_m$, and proving knowledge of $K_m$ to each server $B_i$.

For each server $B_i$
{
    A→$B_i$: $Q_A$ = $P^x$ mod p
    $B_i$→A: $Q_B$ = $Q_A^{y_i}$ mod p, V
    A: $K_i$ = $Q_B^{(1/x \bmod (m-1))}$ mod p
}
Compute $K_m$ := hash($K_1 \| K_2 \| \ldots \| K_i$)
Check validity of $K_m$ (as discussed below)
For each server $B_i$
{
    A→$B_i$: proof($K_m$, $Q_A$)
}

Note that each server $B_1$ doesn't know $K_i$, and can't compute it without knowing the password P. Better still, each $B_i$ doesn't know $K_m$ or P, and can't compute it from V, without knowledge of the other shares. $B_i$ also can't compute it from $y_i$, not even with brute force, unless he gets all shares $y_i$. Thus, the goal that no evil server can compute P unless all n servers 103, 104 are compromised has been achieved. Inability to access even just one of the $y_i$ values makes brute-force infeasible.

Preventing On-line Brute-force Attack

To prevent on-line guessing attacks, the servers 103, 104 will want to limit the number and or frequency of runs of the protocol on a per-user basis. Such techniques are well-known. However, in order to optimize such systems, it is necessary for the servers 103, 104 to distinguish between valid and invalid runs of the protocol. Furthermore, for invalid runs of the protocol, it is also useful to distinguish between legitimate user errors and suspected attacks.

In particular, it is desirable to distinguish between users that accidentally type a wrong password from truly unauthorized attempts to authenticate. Unlike machine-to-machine authentication, mistakes in user authentication are common. In password authentication in particular, there are several common types of mistakes. Perhaps Alice has momentarily forgotten her password and types something similar, but wrong. Or perhaps Alice knows the password, but has made a mistake in typing it. Another common mistake is to type the wrong choice of multiple passwords that she perhaps vaguely remembers. It is very common for users to make such mistakes during a series of login attempts where the last attempt ultimately is valid. If a server counted all these cases as suspected hacker attacks, and if the server had a tight limit on the number of attempts before locking out the user, users might be commonly accidentally locked out of their system.

In the systems 100 described above, Alice can prove her combined knowledge of $\{K_m \| P^x\}$ to all authentication servers 103, 104 to enable them to distinguish her legitimate but erroneous access attempt from a guessing attempt by an attacker. If a server does not receive such a proof, perhaps within a certain time interval, they he should conservatively presume that the guess made with $P^x$ was an invalid and unauthorized access attempt by an attacker, and count it against the limit of allowed bad guesses.

One approach to minimizing the contribution of typographical errors to an invalid access count is to detect duplicate bad entries on the client 101, and avoid sending repeated duplicate bad passwords to the servers 103, 104. Once the client software detects that a specific entry has been rejected by the server, it will display a rejection message for the user. If the user repeats the same invalid entry, the client software may be able to recognize this, and avoid contacting the server again. This optimization must be done only for short durations, in order to minimize the exposure of stored passwords on the client 101.

Forgiveness Protocol

Another novel approach to this problem is now described that is called the "forgiveness" protocol. In this system 100, it is presumed that many accidental entries of the wrong password will be followed in short order by an entry of the correct password. When this occurs, it is desired that the servers 103, 104 forgive the wrong entries, which can be done by effectively removing the incident from the recorded count of invalid access attempts, if it is proven that these mistakes were made by the legitimate user. With forgiveness, a user who frequently mistypes his password is not unnecessarily penalized by a system 100 that maintains a small long-term limit on unauthorized access attempts.

A naive approach would be to simply erase the record of all prior recent invalid attempts after each successful attempt. However, this allows an attacker who knows the system thresholds to make an optimal number of guesses for the password, interleaved between valid runs of the protocol by the real user.

The solution to this problem is to identify (as much as possible) which erroneous access attempts were merely accidental mistakes of a valid user, and to provide this information to the server. This is done by having the client send evidence of known prior mistakes made by that user during each successful run of the protocol. Essentially, the client asks for forgiveness for each such mistake. When the server verifies that a valid user made a mistake, the server discounts (removes) the mistake from the record.

The benefit is that tighter constraints on invalid access counts can be tightened without punishing the user for repeated small amounts of typographical errors.

Figure 3:
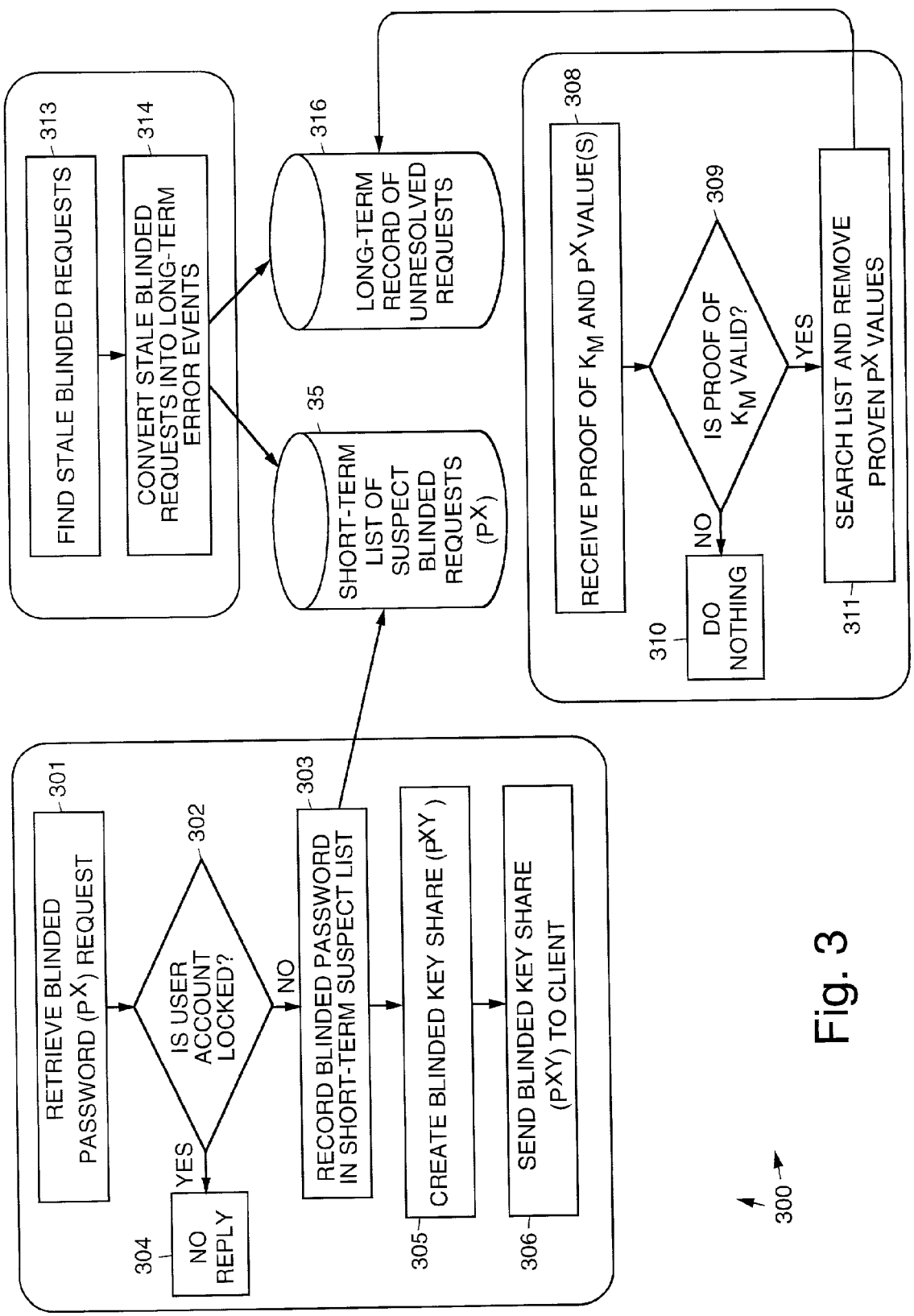
FIG. 3 is a flow diagram illustrating an exemplary method of server operations in accordance with the principles of the present invention.

Referring to FIG. 3, it illustrates an exemplary forgiveness protocol 300 (implemented as software 300), as used in the preferred embodiment of the Modified SPEKE multi-server system 100:

The server 103 maintains the following data variables for each user:

| | |
|---|---|
| Z | count of bad attempts |
| N | number of recent amplification requests |
| R[1..N] | a list of recent $P^x$ password amplification request values |
| T[1..N] | a list of timestamps associated with R[1..N] |

A server 103 receives 301 a blinded password ($P^x$) request. The user account is checked 302 to see if it is locked, according to local policy. If it is locked then a reply must not be sent 303. If it is unlocked, then the blinded password is recorded 304 in a short-term suspect list, a blinded key share ($P^{xy_i}$) is created 305, and the blinded key share ($P^{xy_i}$) is sent 306 to the client 101.

Recording the blinded password request should only be done in the event that the account is NOT locked and a blinded share is to be sent to the client. However, to be safe, recording should be done before the blinded share is sent.

Thus, for each login attempt where a password amplification process 305 occurs, the value of N is incremented, and the server 103 records the value of $Q_A$ used in that run in the list value R[N] in short-term memory 315. The server 103 also records an associated timestamp value in T[N] to note the time that the request was received.

Periodically the server 103 will run a process to find 313 or check 313 for stale requests. When the difference between any timestamp value in T and the current time becomes greater than a specific period of time, the server 103 will delete 314 any corresponding R values. The length of this period may be the typical maximum amount of time that a valid user, who has made a mistake, would be expected to keep trying to login with the correct password. When each R value is removed from the list, the corresponding T value is also removed, and the number of recent amplifications N. At each such event, the count of bad attempts Z in long-term memory 316 is incremented, to indicate that one more password amplification event for an unverified user has occurred.

When a successful login occurs, the client 101 sends the value of $Q_A$, equal to the password raised to a random power, along with any prior values for $Q_A$ from earlier runs in the same login session, to each server 103 in a digitally signed message 308. This message is signed using a key derived from the user's knowledge of the master key $K_m$. The signature is preferably performed using a public-key digital signature on the message using the user's private key U that is verifiable by any server 103 that has the user's public key V.

Alternately, the signature may be performed by computing a keyed-MAC keyed by a key that is shared by the user and a server. In this case the key may be directly derived from $K_m$, or obtained from an encrypted container symmetrically encrypted by $K_m$, but in general the shared key must be unique to each user/server relationship.

This signed message is received by the server 308 and validated 309. The validation step may be either a public-key digital signature verification using the user's public signature key, or alternately, confirmation of the keyed-MAC using a user-specific key known to the server. The server 103 verifies the signature of the user's list of all recent $Q_A$ values, and compares 309 them to the list of values found in earlier recent runs in the list R. When there is no match, the list R is not changed 310. The system should not generally treat the receipt of an invalid proof as either a successful or an unsuccessful login event. When there is a match, the corresponding access attempt is removed 311 from the list R in the short-term memory 315, the corresponding timestamp is also removed, and the value of N is decremented.

A server 103 may choose to limit the number of bad attempts Z, or perhaps the total number of bad attempts and recent unconfirmed amplifications (Z+N). This limit may be either specific for a user, a collection of users, or a system-wide limit. Also, the action to be taken when a limit is exceeded can vary, from locking out the account permanently, locking it out temporarily, and/or presenting an alert condition to a system administrator. Such variation in technique is common in password-based systems.

The server 103 may also want to record information associated with the client 101 or network 102 from which the access events originated. The server 103 might even maintain an account of such events on a per-client basis.

Note that in the Modified SPEKE system 100, even an exposed record of $Q_A$ values poses no security threat for either the client 101 or the server, as this data was already made public.

One concern when using a forgiveness protocol is in a shared workstation setting. If there is a persistent login program always running for long time intervals, an attacker may be able to arrive at the workstation just before the expected arrival time of a targeted user, and the attacker may be able to insert a few guesses that will soon be forgiven. Thus, the system designer needs to account for the likelihood of such an event, and perhaps adjust the forgiveness time window appropriately. Another way to reduce this threat is to use a system that presents a session-based approach to login. The client 101 may use a secure attention key to launch the login window, which remains alive for several access attempts, and then goes away after a period of inactivity. This system would never ask for forgiveness for invalid login attempts made in an earlier session, but all bad attempts within a single session could be forgiven. Users should also be trained to insure that they always use a fresh login session when using a shared workstation.

An obvious process to distribute the $U(Q_A)$ messages would be to have Alice contact all N servers 103, 104 herself. However, to minimize interruptions on these busy machines, we can have Alice contact just one of the servers 103, 104. This server 103, 104 can then propagate the evidence to all other relevant servers 103, 104, and do so in an aggregated series of batched requests. For example, updates can be made every few minutes to distribute the "forgive me" requests for all users of the system for the current interval. This technique can reduce the number of interrupts and amount of communication overhead for each server.

Summary of Forgiveness Protocol

The present system 100 is "forgiving" because it does count mistakes by a valid user against that user account's quota of bad access attempts. It discounts valid transient mistakes as not a threat to the system 100, while still keeping the ability to count and limit invalid access attempts by unknown users This is accomplished by sending evidence of recent prior invalid access attempts after each successful authentication. Upon receiving and validating this evidence, each server erases the mistake from the record, or records the event as a corrected forgivable mistake. By fine-tuning a server's event log in this manner, a system administrator gets a more detailed view of when the system 100 is truly at risk, as opposed to when valid users are merely being frustrated.

The forgiving system 100 requires at least one signature generation step on the client 101 and one signature verification step for each of the servers 103, 104. To minimize computation, the signature steps can be combined with signature steps that authenticate the user. In constructing a valid authentication message for a user, the client 101 includes the set of all recent challenge messages issued by that user, digitally signs the result with the user's private key, and sends it to all servers 103, 104. Each server 103, 104 validates the signature to authenticate the user, and at the same time validates evidence of her recent forgivable mistakes. This implementation of a forgiving system 100 requires no significant extra computation for any party.

Denial of Service

When setting small limits on invalid attempts for account lockout, there is also the increased threat of denial of service attacks. An attacker may simply deny a specific user access to the system 100 by making repeated deliberate invalid access attempts.

One approach to mitigating this problem is to record information about the source of invalid access attempts in the server's record, and to have the server perform lockout operations more specifically on a per-source basis. The source information might include the name or the network address of the originating client computer 101, when such information is available.

Extensions

The basic system 100 described above may be extended in many ways, once the user obtains her master key $K_m$. Each authenticating server, and more generally any other server, can store a private file for the client 101 symmetrically encrypted under the user's master key $K_m$. The file may even be freely sent to the user without authentication, since it is strongly encrypted. This file may contain the user's private key, and any other sensitive data for the user.

The basic multi-server protocols described above may be extended to allow for the case where some subset of the servers 103, 104 are temporarily unavailable.

Note that the shares $K_i$ can be combined in many different ways. One example is to extend this system 100 to permit M-of-N authentication, where access to some subset m of the n servers 103, 104 is sufficient to get enough shares to compose K. One example of this is as follows:

Compute a list of combinations of $\{C_1, C_2, \ldots C_x\}$ where each $C_i$ is one of all possible valid combinations of the $K_i$ shares. For example, when m=n−1, one can compute all valid combinations of n−1 shares with:

for i:=1 to n
  c:=null bit string
  for k:=1 to n
    if k!=i
      c:=$C_i \| K_k$
  $C_i$=hash(c)

The server then stores x different symmetric encryptions of K:C={encrypt($C_1$,K), encrypt($C_2$,K), ... encrypt($C_x$,K)}.

At time of authentication, the client 101 retrieves the list C, decrypts K, and proves knowledge of K to the servers 103, 104. This approach may be practical for small values of m and n.

Short Exponent Problem

Since exponentiation to a power that is roughly the size of q is the dominant cost of the above method, it is desirable to reduce the size of the exponent. One set of methods for providing efficient zero-knowledge methods with short exponents is described by D. Jablon in "Password Key Exchange using a Composite Modulus", Document Disclosure No. 443510, filed with U.S. PTO, Aug. 20, 1998, which is herein incorporated by reference.

Another approach is to use short exponents as discussed by P. C. van Oorschot and M. J. Wiener in "On Diffie-Hellman Key Agreement with Short Exponents" in Proceedings of Eurocrypt 96, Springer-Verlag, May 1996. These authors discuss the relative cost of the known computational attacks, and discuss appropriate size of a short exponent.

However, there may still be a concern that this leaves open the possibility that a technique might be developed to leak information about a password-derived base, given that the resulting domains of exponentiating different password values to a short random exponent are highly distinct.

When using a random exponent x, chosen from an evenly distributed range of values in [1, o(G)], it is apparent that knowledge of $P^x$ alone without knowledge of x reveals no information about P. But when using a short exponent x in the range [1, m] where m<o(G), the security relies on some additional presumption of computational intractability. What if someone finds a special attack for this case?

The use of short exponents in Diffie-Hellman was discussed by van Oorschot, and Wiener, where the authors identify the Pollard lambda method as the most efficient known way to compute a random exponent x of $g^x$ for some known fixed base g. A lambda discrete log computation requires about $x^{1/2}$ operations. The simplistic approach to breaking a password-generated Diffie-Hellman exchange is to compute the exponent for each potential base P', where P' is constructed for each candidate password. However, one might be concerned that an easier solution may exist.

With the (perhaps unwarranted) concern that problem (1) may be significantly easier than a brute-force Lambda attack, we propose an approach to reduce the computation of Alice and Bob, by using a subgroup of prime order that is significantly smaller than the modulus. It is desirable to remove any assumption of computational intractability, at least for the case of an enemy determining information solely from the client's $P^x$ values.

The P=f(g.h) Method for Password-derived Generator

A method to address the issue uses a large prime order subgroup with an order significantly smaller than the modulus. A function is used that (relatively efficiently) converts the password into a generator of this subgroup, and means to efficiently maintain security are used by reducing leakage of information about the server's secret exponent, with potentially fewer assumptions of computational intractability. In this embodiment, the value P is derived from two independent random group elements (g, h), where one of these elements h is raised to a power based on a function of the password.

Fixed system parameters:

Let p=k·q+1, where $2^{1023}<p<2^{1024}$, and $2^{159}<q<2^{160}$, p and q prime.

Let g=hash("g")$^k$ mod p

Let h=hash("h")$^k$ mod p, two unrelated elements of order q

The hash function is a standard cryptographic hash function such as SHA1. The input strings to the function in this example are arbitrary constants, and in this example are the single ASCII character strings "g" and "h". It is important that g and h be arbitrary independent numbers, so that g is not known to be related to h by any known exponential power.

Enrollment

Alice performs the following steps at time of enrollment:

Choose $y \in_R [1, q]$, a random number in the range of 1 to q,

Compute t=hash(password) mod q,

Compute P=g·h$^t$ mod p,

Compute K =P$^y$ mod p,

Store y with server B.

The password-derived t in the exponent raises a concern about the "password-in-exponent" problem identified in the June, 1997 Jablon paper. An attacker must not be able to create a "dictionary of exponents" $\{e_1, e_2, \ldots\}$ to establish a correspondence with a fixed base g and a dictionary of candidate values for P $\{P_1, P_2, \ldots\}$ such that $g^{e_i}=P_i$.

If g and h are chosen independently such they are not related by any known exponential, then the problem is prevented. The construction of the fixed system parameter as described above guarantees this.

Note that if for some reason variable parameters are desired, the client 101 might verify that g and h are suitable by verifying a published certificate that attests to their validity. The certificate may simply be the input to the hash functions—the strings "g" and "h" in this example. If the hash function must be sound, and the hash space must be sufficiently large to prevent collisions, the resulting values should be essentially indistinguishable from random numbers. The discrete log problem insures that the exponential relationship between two such random elements cannot be determined. One such suitable hash function is SHA1 described in "Secure Hash Standard", FIPS 180-1, U.S. National Institute of Standards and Technology.

Authentication

In the password amplification protocol that Alice performs with Bob,

Alice proceeds as follows:
compute t=hash(password) mod q
compute P=g·h$^t$ mod p
choose x $\in_R$ [1, q], a random number in the range 1 to q
compute r=P$^x$
send r to Bob Bob then performs the following:
Abort the process if (r$^q$ mod p)≠1, or r=1.
compute s=r$^y$
send s to Alice Alice then performs the following steps:
Abort if (s$^q$ mod p)≠1, or s=1.
Compute K$_m$=s$^{1/x}$ mod p In this method, Bob and Alice each perform two exponentiations with a 160-bit exponent. This method, when compared to the analogous Ford and Kaliski method, provides a roughly equivalent level of security with considerably less computation, under the assumption that the short-exponent problem is solvable.

This is qualified as "roughly" equivalent, due to the difficulty of determining any exact equivalence relationship between minimal size for exponents and symmetric keys. It is assumed in the example above that random exponent and subgroup sizes are 160 bits, symmetric keys have 80 bits of strength, and the size of the modulus as 1024 bits. Such relationships are difficult to pin down exactly. As one point of reference, note that the DSS signature standard used a 160-bit subgroup of a 512-bit modulus. Other recommendations typically presume a larger modulus size for a 160-bit subgroup. In any case, as recommendations change for increasing key sizes in general, the sizes of the values used in the methods described here may be adjusted appropriately.

Modulus Construction with P=f(g·h)

In the method above, where p=kq+1, and the subgroup of order q is used, there is concern about the factors of k. For all small factors of k, where small means less than some minimal safe size, an enemy can probe the server with specific values T, to obtain T$^y$ mod p. This result may permit the enemy to learn information about the server's exponent y. Let S be the multiple of all small factors of k, recognizing that for each small factor, there is a corresponding small subgroup. The attack can be reduced to a minimal level, of leaking only the low bit of y, by constructing k such that S=2. In one embodiment, p=k q+1, where k=S·r, S=2, and r, q, and p are prime.

The leakage of just the low bit of y should not be a significant problem if the exponent y is truly random. Presuming that the low bit is independently random, the minimal safe exponent size can simply be increased by one bit to compensate. This 1-bit leak may be prevented by making the low bit of y a fixed constant value throughout the system 100.

Security and Efficiency with P=f(g·h)

A similar approach to reducing information leakage from a probing attack is to insure that y is a multiple of S. Here too, the size of y would have to be increased appropriately to compensate for the loss of randomness, such that if S is a ten-bit number, y would be ten bits larger than in the case (described above) where S=2.

With the P=f(g,h) method, we can use a short exponent with more confidence, adding just a small computational expense for the client 101. The performance of this method may be compared to one that uses similarly short exponents but with a value P that generates a much larger group. This method gains the added protection of provable security of the client's first message, with no significant added computation for the server. The client's added cost is the exponentiation of h to the power t.

Finally, the approach used in the present invention that increases security by removing an assumption of computational intractability may someday be proved as being irrelevant. It is possible that the computational security of the use of short exponents may be proven to be equivalent to other assumptions we make for the method as a whole, such as the assumption that the discrete logarithm problem is intractable.

Alternative Key Derivation Functions

Alternate key derivation functions are possible for deriving the master key from the key shares $\{y_1, y_2 \ldots y_n\}$. Three such functions are shown here, the first of these being the same as that used in the examples above.

$K_m$=hash(p$^{y_1}$||p$^{y_2}$|| . . . P$^{y_n}$), using concatenation,
$K_m$=hash(p$^{y_1}$⊕P$^{y_2}$⊕ . . . P$^{y_n}$), using an XOR function,
$K_m$=hash(p$^{y_1}$*P$^{y_2}$* . . . P$^{y_n}$), using the group operator.

In special cases it may be advantageous to combined key shares using exponentiation within the group with a combined key derivation function as shown here, and discussed further below.

$K_m$=hash(P$^{y_1 \cdot y_2 \cdot \ldots \cdot y_n}$), using repeated group exponentiation In the next section, these different alternative functions are shown to be advantageous in different embodiments of the method.

Alternative Flows and Combined Key Derivation Functions

One simple approach for authenticating with multiple servers 103, 104 has the client 101 perform a series of sequential challenge/response protocols with each of two or more servers 103, 104, as in:

| Approach (1) | |
|---|---|
| A: | $m_1$ = P$^x$ |
| A→B$_1$: | $m_1$ |
| B$_1$: | $m_2$ = $m_1^{y_1}$ |
| B$_1$→A: | $m_2$ |
| A→B$_2$: | $m_1$ |
| B$_2$: | $m_3$ = $m_1^{y_2}$ |
| B$_2$→A: | $m_3$ |
| A: | $K_m$ = hash( $m_2^{(1/x)}$, $m_3^{(1/x)}$ ) |

An alternative approach (2) of having the client 101 send a single P$^x$ value to multiple servers 103, 104 simultaneously may be advantageous in environments where the client 101 can gather the responses asynchronously, which lets the servers 103, 104 (B$_1$, and B$_2$) work at the same time in parallel to compute and send the responses.

| Approach (2) | |
|---|---|
| A: | $m_1 = P^x$ |
| A→B$_1$: | $m_1$ |
| A→B$_2$: | $m_1$ |
| B$_1$: | $m_2 = m_1^{y1}$ |
| B$_2$: | $m_3 = m_1^{y2}$ |
| B$_1$→A: | $m_2$ |
| B$_2$→A: | $m_3$ |
| A: | $K_m = $ hash$(m_2^{(1/x)}, m_3^{(1/x)})$ |

Approach (2) may reduce the overall running time, when compared to approach (1).

A further optimization in Approach (2) is to derive the master key from the group product of the key shares, as in $K_m$=hash$(K_1*K_2* \ldots K_n)$. In this case Alice can perform computation $K_m$=hash$((m_2* m_3)^{(1/x)})$, which reduces the amount of exponentiation she must perform.

In particular, FIG. 4 is a flow diagram illustrating an exemplary method 400 in accordance with the principles of the present invention showing operation of a client with two servers using the group product key derivation function with optimized computation.

In step 401, at enrollment time {UserID, $y_i$, V} is stored on each server 103, 104, and encrypted copies of a hash of P($H_p$=hash(P)) and the user's private key U are saved in a directory associated with or related to the user's identifier {UserID, encrypt($K_m$, {$H_p$, U})}. Note that the encrypted container include a message authentication code, to insure that the container cannot be modified to corrupt U without also corrupting $H_p$.

At time of login, in step 402, a group element (P) that is an appropriate function of an entered password (as discussed above) is created. In step 403, a blinded key share ($m_1=P^x$) is formed. In step 404, the blinded key share is sent to each server B$_1$ 103 and B$_2$ 104.

In step 405, a blinded key share ($m_2=m_1^{y1}$) is formed on the first server (B$_1$) 103. In step 406, server B$_1$ records the blinded password in short-term memory, and in step 407 sends the blinded key share ($m_2$) to Alice. In step 408, Alice obtains from the public directory her encrypted password verifier $H_p$ and private key U. (Step 408 can be done at any convenient time.) In step 409, a blinded key share ($m_3=m_2^{y2}$) is formed on the second server (B$_2$) 104. In step 410, the second server (B$_2$) 104 records m1 in short-term memory and in step 411 sends $m_3$ to Alice. In step 412, Alice 101 unblinds the shares and creates her master key $K^m$=hash $((m_3*m_3)^{(1/x)}$ Note that $K_m$=hash$(P^{y1}*P^{y2})$, using the group product of shares for key derivation.

In step 413, the client 101 decrypts the directory data using $K_m$ to retrieve $H_p$ and U. In steps 414 and 415, the client 101 aborts if $H_p$ is not equal to hash(P). In step 416, the client 101 creates a signed message $m_4$ containing the blinded password $m_1$ using her private key U, and sends it to B$_1$ and B$_2$ as proof that she is acting on behalf of the legitimate user. In step 417, each server 103, 104 verifies the signature on $m_1$ in message $m_4$ using the user's public key V. In steps 418 and 419, if the signature on $m_1$ is verified and $m_1$ is found in the short-term list of suspect login requests, the blinded key share $m_1$ is erased from the list.

However, there may be cases where serialization of message flows is inevitable, as in the example of a chained approach, where server B$_1$ acts as an intermediary between the client 101 and server B$_2$. In this case, we can use an alternate combined key derivation function to derive the master key using serial exponentiation of the blinded key, as in $K_m$ hash$(P^{y_1*y_2* \ldots y_n})$.

| Approach (3) | |
|---|---|
| A: | $m_1 = P^x$ |
| A→B$_1$: | $m_1$ |
| B$_1$: | $m_2 = m_1^{y1}$ |
| B$_1$→B$_2$: | $m_2$ |
| B$_2$: | $m_3 = m_2^{y2}$ |
| B$_2$→B$_1$: | $m_3$ |
| B$_1$→A: | $m_3$ |
| A: | $K_m = $ hash$(m_3^{(1/x)})$ |

Note that the order of computations performed by B$_1$ and B$_2$ are interchangeable, and that B$_2$ can simply send $m_3$ directly to A. This approach is described in detail below and is shown in FIG. 5. An alternative equivalent sequence is:

| Approach (4) | |
|---|---|
| A: | $m_1 = P^x$ |
| A→B$_1$: | $m_1$ |
| B$_1$→B$_2$: | $m_1$ |
| B$_2$: | $m_2 = m_1^{y2}$ |
| B$_2$→B$_1$: | $m_2$ |
| B$_1$: | $m_3 = m_2^{y1}$ |
| B$_1$→A: | $m_3$ |
| A: | $K_m = $ hash$(m_3^{(1/x)})$ |

The combined key derivation function can also be used with Alice as the intermediary in a serialized approach:

| Approach (5) | |
|---|---|
| A: | $m_1 = P^x$ |
| A→B$_1$: | $m_1$ |
| B$_1$: | $m_2 = m_1^{y1}$ |
| B$_1$→A: | $m_2$ |
| A→B$_2$: | $m_2$ |
| B$_2$: | $m_3 = m_2^{y2}$ |
| B$_2$→A: | $m_3$ |
| A: | $K_m = $ hash$(m_3^{(1/x)})$ |

This process in approach (5) of using the combined key derivation function to reduce Alice's exponential computations in deriving K can be extended in an obvious manner to any number of servers 103, 104. In this approach Alice should send a proof of her knowledge of $m_1$ to server B$_1$, proof of $m_2$ to server B$_2$, and so on.

However, when servers 103, 104 act as intermediaries in the computation, and Alice does not have access to intermediate results, another approach may be needed to prove her active participation. A special instance of a two-server configuration using the combined key derivation function where Alice only communicates directly with server B$_1$ is shown in FIG. 5. More particularly, FIG. 5 is a flow diagram illustrating an exemplary method 500 in accordance with the principles of the present invention showing operation of a client 101 communicating with only one of two servers 103, 104.

In step 501, at enrollment time {UserID, $y_i$, V} is stored on each server 103, 104, and encrypted copies of a hash of the password ($H_p$=hash(P)) and the user's private key U are saved in a directory associated with or related to the user's identifier {UserID, encrypt($K_m$, {$H_p$U})}. Note that the encrypted container include a message authentication code, to insure that the container cannot be modified to corrupt U without also corrupting $H_p$.

At time of login, in step 502, a group element (P) that is an appropriate function of an entered password (as discussed above) is created. In step 503, a blinded key share ($m_1=P^x$) is formed. In step 504, the blinded key share is sent to server $B_1$ 103.

In step 505, a blinded key share ($m_2=m_1^{y_1}$) is formed on the first server ($B_1$) 103. In step 506, server $B_1$ records the blinded password in short-term memory, and in step 507 sends the blinded key share ($m_2$) to the second server $B_2$ 104. In step 508, Alice obtains from the public directory her encrypted password verifier $H_p$ and private key U. (Step 508 can be done at any convenient time.) In step 509, a blinded combined form of both key shares ($m_3=m_2^{y_2}$) is formed on the second server ($B_2$) 104. In step 510, the second server ($B_2$) 104 records $m_3$ in short-term memory (Note that he records the reply value, rather than the request value. See below for further discussion.) In step 511 $B_2$ sends $m_3$ to $B_1$, who forwards it to Alice. In step 512, Alice 101 unblinds the combined shares and creates her master key $K_m$=hash($m_3^{(1/x)}$)) Note that $K_m$=hash($P^{y_1 y_2}$), using repeated exponentiation for key derivation.

In step 513, the client 101 decrypts the directory data using $K_m$ to retrieve $H_p$ and U. In steps 514 and 515, the client 101 aborts if $H_p$ is not equal to hash(P). In step 516, the client 101 creates a signed message $m_4$ containing both the blinded password $m_1$ and the blinded combined key shares value $m_3$ using her private key U, and sends it to $B_1$ as proof that she is acting on behalf of the legitimate user. $B_1$ also forwards this message to $B_2$. In step 517, server $B_1$ 103 verifies the signature on $m_1$ in message $m_4$ using the user's public key V. In steps 518 and 519, if the signature on $m_1$ is verified and $m_1$ is found in the short-term list of suspect login requests, the blinded key share $m_1$ is erased from the list.

In step 520, server $B_1$ 103 verifies the signature on $m_3$ in message $m_4$ using the user's public key V. In steps 521 and 522, if the signature on $m_3$ is verified and $m_3$ is found in the short-term list of suspect login requests, the blinded key share $m_3$ is erased from the list.

In this case, $B_1$ is an intermediary between Alice and $B_2$. Alice proves knowledge of the request value $P^x$ to $B_1$, and proves knowledge of the reply value ($P^{x \cdot y_1 y_2}$) to $B_2$. Variations like this are needed because server $B_2$ cannot necessarily trust that $B_1$ is honest, and needs to have proof that a specific value known to both $B_2$ and Alice was used in the computation of $K_m$. In this case the specific value is either the server's input value, or the server's response value.

Note the asymmetry in verification operations of $B_1$ and $B_2$ in the preceding exemplary embodiment. It may be desirable to use an alternate method where $B_1$ and $B_2$ perform similar operations. For example, both can store both the input request value ($m_1$ for $B_1$ and $m_2$ for $B_2$) as well as the reply value ($m_2$ for $B_1$ and $m_3$ for $B_2$), in the short-term list and perform the verification function by checking both. When a signature is received where either the request or reply values match that stored in the short-term list, then the key retrieval process can be considered to be valid. The hash function in all of these approaches can be implemented as a one-way hash function of the arguments treated as fixed-length bitstrings. Multiple arguments may be concatenated, as shown in this implementation using the SHA1 standard hash function discussed in "Secure Hash Standard", FIPS 180–1, U.S. National Institute of Standards and Technology:

$$\text{hash}(x,y)=\text{SHA1}(x\|y)$$

Other similar key derivation functions are well known.

Validation of $K_m$ and Prior Server Authentication

Because the security of the communication channel is not presumed, the user's client 101 performs a validity check on the combined master key before using it in any way that reveals information to an enemy. If the validity check fails, the user aborts the process.

One way for the user to check $K_m$ is to obtain an additional message that has been symmetrically encrypted with a key based on the correct enrolled value of $K_m$. The user may obtain this encrypted message from any convenient place, such as any one of the authentication servers 103, 104. Using the negotiated value for $K_m$, the user decrypts the message, and performs the validity check on the decrypted data. If it is invalid, the client 101 will abort the process, and insure that no information is revealed about the negotiated value for $K_m$.

One way to validate the message is to embed a large fixed system constant value J in the data. The client 101 is assured that the key is correct when the decrypted value matches J. Yet, depending on the encryption system, there may be concern that an enemy can specially construct a message such that decryption of the message with several different keys all yields clear-text data containing the value J. While this should not be possible with a well-designed encryption system, one defense against this is to make J a function of the password.

In one embodiment, we compute J as a one-way hash of the password, as in SHA1("J" ∥ password). The client 101 decrypts the message using $K_m$, and compares the decrypted value of J against SHA1("J" ∥ password), and if they match, $K_m$ is presumed to be valid. If they don't match, the client 101 must abort the process of authentication, and insure that no values derived from his invalid value for $K_m$ are made available to potential enemies.

Validation of $K_m$ implicitly validates all of the amplified key shares that were used to create $K_m$.

Small Subgroup Confinement of Shares

Another issue that might raise concern is that an enemy who controls the network 102 may, instead of returning $P^y$, merely return small subgroup elements, like the identity element 1. In the case where all server responses are small group elements, $K_m$ will be forced to one of a small set of values. For example, in the special case where all server responses are 1, $K_m$ would be computed to have a constant value, such as:

$$K_m=\text{hash}(1^{1/x}, 1^{1/x}, \ldots)=\text{hash}(1,1,\ldots).$$

Note that subgroup confinement will not be a problem with the preferred validation method for $K_m$, but it could be a problem if the value for J were a fixed system constant. In this case an attacker could construct validation data such that, regardless of the password, the identity element would decrypt the message to always reveal the well-known fixed value for J. Similarly, in the case where {$y_1 y_2, \ldots$} are all elements of very small subgroups, the enemy could construct a message such that there may be a significant chance that client 101 will decrypt the message to find the fixed value for J.

An alternative way to prevent small subgroup confinement of K is to have the client 101 detect this directly as is described in U.S. patent application Ser. No. 08/823,961, and papers by S. Bellovin and M. Merritt, entitled "Encrypted Key Exchange: Password-based protocols secure against dictionary attacks", *Proceedings of the IEEE*

Symposium on Research in Security and Privacy, May 1992, and W. Diffie, P. C. van Oorschot, and M. Wiener, entitled "Authentication and Authenticated Key Exchanges", Designs Codes and Cryptography, 2, 107–125, (1992). To minimize the number of special cases that the client 101 must check, the client 101 may also raise the received value to a power that forces the result into a smaller set of elements, perhaps into the set {1}, and then test for these cases as described in U.S. patent application Ser. No. 08/823,961. By precluding these special cases, a wider variety of validation tests for $K_m$ may be safely used.

Note that the probing attack by one who controls the values for $\{y_1y_1, \ldots y_N\}$ and makes a specific guess for the value for P is always possible. Recalling that the goal here is to force the enemy to make at most one guess for P in each run of the protocol, this is not a protocol concern.

Variations in Group Parameters

It is typically assumed that the system parameters that define the group to be used, including the modulus m and any necessary factors of (m−1), are fixed system parameters built into the client and server implementations. These values may be used for all users of the system 100.

Alternatively, these methods may use any suitable group, such as the group of points on an elliptic curve, as is common practice in elliptic curve cryptographic methods for Diffie-Hellman and related protocols described in IEEE Std 1363-2000, IEEE Standard Specifications for Public-Key Cryptography, IEEE, Aug. 29, 2000, A.11.1, p. 131.

The methods may also use variable parameters sent to the client 101 by a server, or vice-versa. In this case, the parties must be responsible for insuring that the parameters are valid, either through the use of primality tests, or by validating a certificate for the parameters that was generated by a trusted party, or by any other means that gives sufficient assurance of validity for these parties.

"Random" Exponents

The secret exponents $\{y_1y_2, \ldots\}$ should be independent numbers, chosen such they are unavailable to any potential enemy. It may be sufficient to derive that these numbers from a pseudo-random number generator, as long as they appear to be independent random values by any potential enemy. A common cryptographic practice is to derive a sequence of pseudo-random numbers for such cryptographic purposes from one or more common secret sources of random input using a hash function.

Alternatives in Weaker Models

In the course of development of the preferred embodiment of the present invention, as described below, alternative methods were developed that operate in weaker models, in some cases without using zero-knowledge password techniques. While less than ideal, these methods provide alternatives that can be useful in special cases. The three embodiments described herein are a single-server system 100 with client storage (herein referred to as AM1), a two-server roaming system (AM2) 100, and a multi-server roaming system (AMM) 100.

Alternative to CC

The AM1 system 100 is an alternative to the CC system 100 for the single-server environment. The AM1 system 100 removes all the special constraints imposed by CC, broadens the functionality of the user's private key, and still provides at least an equivalent level of security for the user's password as CC. While the CC system 100 introduces some tough restrictions on the use of the underlying public key system, and use of the user's private/public key pair, the AM1 approach eliminates these restrictions. This approach can provide a better alternative to CC that is easier to understand, build, and analyze than CC.

Enrollment

In AM1 enrollment, the client 101 chooses a PIN code P, and a private key $E_C$ and corresponding public key $D_C$ for an asymmetric encryption system. There are no special restrictions imposed here on the construction of $E_C$ and $D_C$. The client 101 constructs S=f(salt, P), and V as verification data for S, using a function f that is appropriate for the enrollment process of a zero-knowledge or any other appropriately strong password system. Preferably, this uses a strong extended password system that tolerates a low-entropy S, such as B-SPEKE, discussed in the June, 1997 Jablon paper.

Client stores:

| | |
|---|---|
| salt | secret salt value, stored only on the client 101 |
| $D_S$ | the public key of the authentication server (AS) |
| $D_S(V)$ | the client password verification data sealed for the AS |
| $D_S(encrypt(K,E_C))$ | the client private key encrypted under K, and then sealed for the AS |
| $D_C$ | the client public key, not a secret |

Authentication

In AM1 authentication, the user enters P, and the client 101 computes S=f(salt, P), sends $D_S(V)$ to server, and performs suitably strong password authentication with server based on S and V. This may be preferably done using the B-SPEKE method.

Once the user is authenticated with S, as verified by V, the server sends back encrypt(K,$E_C$) such that only the user who proved knowledge of S can read it. Preferably, the server may send $Enc_{K_2}$(encrypt(K,$E_C$)) where $K_2$ is the session key generated by the B-SPEKE protocol that proved the client's knowledge of S. The client 101 knows $K_2$ and K, and thus can decrypt $E_C$.

The client 101 is then free to use the $\{E_C/D_C\}$ key pair for general public key purposes. No restrictions are imposed on the use of $E_C$ and $D_C$, in contrast with the CC system which limits their use to transactions with the authentication server alone. Also, a certificate or chain of certificates may be associated with the client's public key.

Alternative to CC Roaming for Two-Servers

The AM2 system 100 will now be described, that provides an alternative to CC when modified for use in a two-server roaming solution. The AM2 system 100 is a simpler solution than the CC Roaming solution described above.

Enrollment

In AM2 enrollment, the user selects two passwords $P_1$, and $P_2$, preferably chosen as independent values, such that knowledge of $P_1$ does not reveal information about $P_2$, and vice-versa. A user constructs verification data for each password, $V_1$ and $V_2$, respectively. The user also selects two random keys, $Y_1$ and $Y_2$, and constructs K=hash($Y_1$, $Y_2$). The user symmetrically encrypts private data, preferably including a private key $D_A$, using a master key K.

A first authentication server $AS_1$ securely stores $\{V_1, Y_1,$ and optionally encrypt(K,$D_A$)$\}$ A second authentication server $AS_2$ securely stores $\{V_2, Y_2,$ and optionally encrypt(K,$D_A$)$\}$ If encrypt(K,$D_A$) is not stored elsewhere, then one of these servers 103, 104 must store it and return a copy of it to the client 101 when the client 101 authenticates with $P_1$, or $P_2$.

User authenticates to $AS_1$ using $S_1$ to obtain $Y_1$.

User authenticates to $AS_2$ using $S_2$ to obtain $Y_2$.

User's master key $K=\text{hash}(Y_1, Y_2, S_1, S_2)$.

User unlocks her encrypted private key encrypt($K, D_A$) using key K.

Because there are no special restrictions on $E_A$, one or more server's can store $E_A$ openly, and send it to the client 101 in unencrypted form.

Authentication

In AM2 authentication, the client 101 uses $P_1$ to obtain an authenticated session key $KS_1$ with server $AS_1$, using $AS_1$'s verification data $V_1$. $AS_1$ returns $Y_1$ symmetrically encrypted under $KS_1$.

The analogous process repeats with the client 101 using $P_2$ to authenticate to server $AS_2$, to retrieve $Y_2$.

One of the two servers 103, 104 returns encrypt($K, D_A$).

The client 101 computes $K=\text{hash}(Y_1, Y_2, S_1, S_2)$ and decrypts $D_A$.

$D_A$ and $E_A$ may now be used as the user's fully functional private and public keys.

Alternative Embodiment

In an alternate embodiment of AM2, in situations where the client 101 and/or the user, or one or both authentication servers 103, 104, are capable of pre-storing or verifying the authenticity of the a server's public key, a server's stored data may be encapsulated by sealing it with that server's public key. This makes the data only accessible to that server, which is presumed to be the only entity possessing the corresponding private key. Such a sealed data set may then be stored on the client 101, or on the other authentication server, as needed.

Also note that this method scales in the obvious way to any number of N servers 103, 104, where N>2. The process for enrolling and obtaining a key share from the $N^{th}$ server may be identical to that for the first or second servers 103, 104. The combine key may naturally be computed as $$K=\text{hash}(k_1 \| k_2 \| \ldots k_n).$$

The scaling issue is discussed below, and the issue of fault tolerance is addressed, to allow successful authentication with only m of n servers 103, 104, where n>m>1.

A Non-zero-knowledge Multi-server Method

The AMM system 100 is now described for multi-server environments. The AMM system 100 operates in a weaker security model than the preferred multi-server roaming systems 100 described above. One example does not use a zero-knowledge password protocol at all, but still preserves the property that each $B_i$ doesn't store passwords or crackable data in his database. The design and comparable limitations of this system 100 are discussed.

Each AMM server $B_1$ stores a $y_i$ value for each user, as in the preferred system 100 described above. Each $B_i$ receives P from Alice, but in unblinded form. He responds to Alice with $K=\text{hash}(P, y_i)$. Since $B_i$ doesn't store any password-derived data, there is no threat of dictionary attack on the stolen database.

For each server $B_i$, $A \to B_i: P$ $B_i \to A: Ki = \text{hash}(P, y_i)$ $K_m$ is computed and proven as above.

This method needs additional protection for the communications channel, or else an eavesdropper can mount a dictionary attack on P. One solution here is to use an SSL/TLS server-authenticated channel.

Limitation: Attack on Bob

A significant limitation that is not addressed in the AMM system 100 is that passwords may be stolen while in use on the server. An attacker that gets high-privileged access to Bob may also be likely to get a chance to make a malicious change to Bob's software. Such a change can be made in the form of a patch or update that installed by a malicious administrator, a malicious or curious hacker, or even indirectly by a virus. When Bob momentarily receives the value of P for a user of the system 100, the patched software can take control, intercept and gather these passwords, and make them available to attackers. Effectively the attacker can build his own password database, even though such a database is not normally present on the system 100.

Limitation: Attack on the Communications Channel

Another limitation of AMM, or any other non-zero-knowledge multi-server method, is that it requires some other means to secure the channel to prevent eavesdropper dictionary attack on P. While this may be achieved with SSL or some other protocol, this poses additional requirements for the client 101 to maintain keys or certificates that tend to make the system 100 weaker and unacceptable for a roaming solution.

Many non-zero-knowledge forms of password authentication are possible, but Bob generally receives information in each run of these protocols to enable his dictionary attack. Thus, this information may also be leaked to an attacker who compromises Bob. A zero-knowledge password protocol is essential in preventing attacks with compromise of an active server.

The Present Simplified Security Model

A notable aspect of our methods is that they operate in a very simple security model. The client computer 101 does not need to store any user or server specific state, and we do not require any previously secured or authenticated communication channel between any components. This model is simpler than that presented in any earlier method for secure multi-server password authentication.

In the preferred embodiments, the client 101 does not need to keep long-term credentials for the user or any server. This simpler model reduces additional points of failure, as might be present in common SSL/browser model of multiple root certificate authorities. The SSL/browser model creates a number of potential weak links in a complex chain of trust, which requires substantial action and/or attention from the user. Our simpler model eliminates the substantial risks that have typically been attributed to "human error" in models that rely on prior authentication of the servers 103, 104.

The present invention has broad applicability. The benefits of the methods of the present invention are not limited to roaming applications. A non-roaming application, the user's master key $K_m$ is retrieved using the above preferred system 100, and $K_m$ is used to access and decrypt locally stored credentials on the user's personal laptop machine. This provides uncrackable local storage protected by a small user chosen password, and the remotely stored key share factors $\{y_1, y_2, \ldots\}$ using no special hardware. There is also the added assurance that $K_m$ and the protected data will not be revealed to an enemy even if he attacks all the relevant network servers 103, 104, as long as does not also have access to the local laptop data.

The master key may be used to create symmetric keys to decrypt private data stored in publicly accessible places, to create symmetric keys to authenticate, and to directly derive a public/private key pair for receiving sealed messages.

The above-described systems 100 provide the best possible software-based alternative to smartcards.

Detailed Protocol Description

Presented below is an implementation of the protocol in detail, using the notation summarized in Table 1 below.

TABLE 1

Notation.

| Symbol | Meaning [Reasonable example] |
|---|---|
| $C_i$ | list of credentials stored by $B_i$ |
| P | element of $G_q$ corresponding derived from *password* [hash(password)$^{2r}$ mod p] |
| $G_q$ | group of prime order q [in $Z_p^*$, p = 2rq + 1, $2^{2j} > q > 2^{2j-1}$, $2k > p > 2^{k-1}$, p and r prime] |
| hash | a cryptographic hash function [SHA1] |
| j | security parameter for resisting brute-force attack [80] |
| k | security parameter for resisting NFS discrete log attack [1024] |
| $K_i$ | Shared key between Alice and $B_i$ [hash($K_m \| i$)] |
| $K_m$ | Alice's master key [a hash of concatenated shares hash($S_1 \| \ldots \| S_n$) mod 2j] |
| $L_i$ | list of suspected bad attempts stored by $B_i$ |
| password | user's password, 0 < *password* < $2^{2j}$ [SHA1(ASCII password)] |
| $R_i$ | a blinded key share = $P^{xyi}$ |
| $S_i$ | a key share = $(P)^{yi}$ |
| U | Alice's private signing key |
| $U_K$ | Alice's encrypted private key = encrypt(K,U) |
| V | Alice's public key corresponding to U |
| $y_i$ | Alice's secret share exponent stored by $B_i$ |
| encrypt(x,y) | message y encrypted with symmetric key x |
| decrypt(x,y) | message y decrypted with symmetric key x |
| sign(x,y) | message y signed with private key x (such that message y can be read) |

Parameters. In this protocol two security parameters are defined, j which represents the desired bit-strength for symmetric functions, and k representing the number of bits required for the modulus of asymmetric functions.

$G_q$ is defined as the subgroup of order q in $Z_p^*$, where p, q and r are odd primes, p=2rq+1,$2^k$>p>$2^{k-1}$, r≠q, and $2^{2j}$>q>$2^{2j-1}$. A function is used that maps a password to a group element P ∈ $G_q$, wherein P=hash(password)$^{2r}$ mod p.

(Alternatively one might use an elliptic curve group in GF(p) with a group of points of order r·q approximately equal to p, prime q, and small co-factor r ∈ [1,100] or so. In this case all exponentiation is replaced with scalar point multiplication, and define P=r·point(hash(password)), where point uses hash(password) to seed a pseudo-random number generator to find an arbitrary point on the curve. This is discussed in the paper by D. Jablon, entitled "Strong password-only authenticated key exchange", *ACM Computer Communications Review*, vol. 26, no. 5, October 1996

Enrollment.

Alice selects a password P, computes P:=hash(password)$^{2r}$, and creates a private key U and corresponding public key V suitable for performing digital signatures. She then creates n key shares where each i$^{th}$ share $S_i \in G_q$ is formed as $S_i$:=$P^{yi}$ using randomly chosen $y_i \in_R$ [1, q-1]. She then creates her master j-bit symmetric key with $K_m$:=hash($S_1 \| \ldots \| S_n$) mod $2^{2j}$, creates her encrypted private key as $U_K$:=encrypt($K_m$, U), and creates her key verification data proof$_{PKm}$:=hash($K_m \| g$).

To enroll these credentials, the client 101 sends Alice's credentials to be stored in a list $C_i$ maintained on each $B_i$. They must perform these actions using an authenticated communication method that assures the proper identity of A:

Client: for each i ∈ [1,n],{enroll, A, $y_i$,V,$U_K$, proof$_{PKm}$}→$B_i$

Servers: store {A,$y_i$,V,$U_K$,Proof$_{PKm}$} in $C_i$

Authenticated Retrieval. For authenticated credential retrieval, the client 101 and servers 103, 104 and perform the actions listed below. In this process, each server maintains a list $L_i$ containing a record of suspected bad access attempts.

Client:

select a random number x ∈ [1,q-1]
Q := $P^x$ mod p
{ request, A, Q } → Servers
Servers:

retrieve { A, $y_i$, V, $U_K$, proof$_{PKm}$ } from $C_i$
t := CurrentTime
append { A, Q, V, t } to $L_i$
$R_i$ := $Q^{yi}$
{ reply, $R_i$, $U_K$, proof$_{PKm}$ } → Client
Client:

for each i ∈ [1,n],
    $S_i$ := $R_i^{1/x}$ mod p
K' := hash( $S_1 \| S_2 \| \ldots \| S_n$ )
if proof$_{PKm}$ ≠ hash(K' $\|$ g), abort
U := decrypt(K, $U_K$)
for Q' in { Q, $Q_1$, $Q_2$, ... }
    { confirm, Q', sign(U,Q') } → Servers }
Servers:

for each received { confirm, Q', Q'$_U$ }
    for any {A, Q, V, t} in $L_i$ where Q = Q'
        verify sign(U, Q') as signature of Q with V
        if the signature is valid,
            remove {A, Q, V, t} from $L_i$ Periodically, perhaps once a minute, each $B_i$ scans its list $L_i$ for bad entries {A,Q,V,t} where (CurrentTime-t) is too large to be acceptable. When a bad entry is found, the entry is removed from the list, and a bad access attempt event is triggered for user A. Note that as an optimization, Alice need only compute and send a single signature to authenticate a list of all recent Q values to all servers 103, 104.

Performance Improvement

There are several factors to consider when comparing the FK1 protocol to ours, including the cost of the group arithmetic for the basic blinding functions, the cost of related verification functions, and the cost, benefits, and risks of using a server-authenticated channel to each server.

Cost of Blinding Operations. With security factors j=80 and k=1024, the new protocol provides significantly higher performance than the FK1 protocol. Using q=(p−1)/2, each FK1 server must perform one 1023-bit exponentiation and the client must perform two.

When using p=2rq+1 as shown our method, we're using a subgroup of order $2^{160}$>q>$2^{159}$. In the latter case, two client and one server computations are reduced to roughly ⅙ of the former amounts. Given the differing ways to evaluate equivalent symmetric and asymmetric security parameters, your mileage may vary.

However, the client benefit is not realized when Alice must perform the 864-bit exponentiation in P:=hash(password)$^{2r}$. Yet, some of the benefit can be reclaimed in alternate constructions of P, such as the one described below.

This comparison so far ignores any added savings that can be achieved by eliminating the setup of the server-authenticated channel. However, by eliminating all server-authentication, the savings may come at the expense of allowing a little online guessing by false servers 103, 104, and perhaps revealing the identity A to eavesdroppers.

Alternative Construction of P. The alternative construction P:=$g_1 \cdot g_2^{hash(password) mod\ q}$ man be used. This uses fixed parameters $g_1$ and $g_2$ which are two random elements of order q with no known exponential relationship to each other. One possibility for creating universally acceptable values for $g_1$ and $g_2$ is to use a hash function as a random oracle, as in $g_1:=\text{hash}("g1")^{2r} \bmod p$.

With the same security parameters, the alternate construction requires three 160-bit exponentiations for the client 101, and one for the server, which reduces the client cost by 53% and the server cost by 84%, when compared to FK1.

Cost of Authentication Function. The method above requires a digital signature for the user to prove authenticity of her set of blinded passwords. Fortunately, client signature generation can be done once to create a message that encompasses one or more recently sent password requests for all servers 103, 104, and server signature verification is fast when using RSA.

Furthermore, to eliminate the cost of a public key signing operation on the client 101, Alice might instead "sign" her set of blinded passwords with a keyed message authentication code, using a shared secret key $K_i=\text{hash}(K_m \| i)$ that she enrolls with $B_i$. In this case she enrolls distinct keys and constructs distinct signatures for each server.

Arguments for Security. A few simple arguments are presented below relating to the security of the present invention.

Each key share is a strong secret. The crucial data for each share is stored only in the secret $y_i$ value on a hopefully secure credentials server, and it is released only in the exponent of a modified Diffie-Hellman exchange. This calculation is modulo a prime of the form $p=2rq\,30\,1$, which severely limits the information that an attacker can obtain about $y_i$. All that can be determined by a probing attack is whether $y_i$ has factors in common with $2rq$. However, since $y_i$ is random and all factors other than 2 are huge, the probability is vanishingly small. Thus, as noted in the June, 2000 Ford and Kaliski paper, the only information that can be determined is the low bit of $y_i$.

Alice leaks zero information about P in her blinded request messages, since for any revealed value there's an equal probability that it was generated by any given P. Also, even the presence of additional data, like the $P^{xy}$ values, does not help the attacker determine P, since the y values are unrelated to P by any data known to an attacker.

The chance of information leakage from Alice in her confirm messages to an enemy in control of the channel is negligible, since she will abort before releasing any useful information if she receives any invalid reply from a server. Due to the combining hash function, if one share of the master key is incorrect, then with overwhelming probability the combined key will be incorrect. Also, if the master key is incorrect, then by the same reason the verifier hash value will be incorrect. So if they do match, Alice can be sure that her master key is correct.

The communications channel does not have to guarantee the integrity of the $U_K$ and $\text{proof}_{PKm}$ values sent by a server. To see why, consider an evil party that fabricates these values and sends them to Alice. At worst, this enemy can either validate a single guess for the password in each run, or perform a denial of service attack. If the client 101 is designed to be no more tolerant of bad guesses than the server, then these attacks are roughly equivalent to the possible attacks in the secure channels model. Fortunately, people tend to have a low tolerance for login failures, and are likely to complain to systems administrators about recurring problems. However, the client 101 must be designed to insure that at least the user is made aware of all failures. In both models, an enemy can make a limited small number of on-line guesses, in at least one direction, and can cause denial of service by modifying or deleting messages.

Both the hash(password)$^{2r}$ function and the alternate construction discussed above guarantee an element of order q, and protect against the password-in-exponent and short-exponent problems noted in the June, 1997 D. Jablon paper and June, 2000 Ford and Kaliski paper.

Short Exponents

An alternative approach to reducing computation is to use shorter exponents. For example, in a group with $p=2q+1$, with a 1023-bit q, one might use exponents in the range $[1,2^{160}-1]$. The use of short exponents in Diffie-Hellman was discussed in the van Oorschot, et al. May, 1996 paper. When using short exponents, the Pollard lambda method is the most efficient known way to compute a random exponent x of $g^x$ for some known fixed base g. A lambda discrete log computation requires about $x^{1/2}$ operations. Yet there are no guarantees that a simpler solution will not be found.

Consider an aborted protocol, where the user simply reveals a series of blinded passwords, and no other information is available to an attacker. When using a full-size evenly distributed random exponent $x \in {}_R[1, o(G_q)]$, the $P^x$ values reveal zero information about P.

When using a short exponent $x \in {}_R[1,m]$, $m \ll q$, the security may require an added assumption of computational intractability, and it is desirable to remove unnecessary assumptions. Whether this assumption is significant is an open question.

So, with the (perhaps unwarranted) concern that short exponents introduce an unwanted assumption, a preferred approach to reducing computation is to use a subgroup of prime order significantly smaller than the modulus.

The present invention uses a simpler model than that used in the prior art. In doing so it eliminates problems inherent in systems where people must securely identify servers 103, 104, but don't. The present invention achieves all of the prior goals, in a simpler model, with no need for client-stored keys or certificates, with increased performance, and with enhanced accountability to better manage human errors in password entry. These methods can also provide at least an equivalent level of security against discrete log attack with considerably less computation.

Thus, systems, methods and software that provide for remote password authentication using multiple servers have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A system that provides for remote password authentication, comprising:
   a client;
   a plurality of authentication servers;
   a network interconnecting the client computer and plurality of authentication servers; and
   a memory, coupled to the client, the memory maintaining instructions that when executed by the client, cause the client to receive a password, transmit a unique random value $y_i$ to each of the servers, derive a group element (P) from the password, send a blinded password value ($P^x$) to the servers, receive blinded key shares ($P^{xy_i}$) from the servers, unblind and combine the key shares to create a master key ($K^m$), and decrypt encrypted private data using the master key ($K_m$).

2. The system recited in claim 1 wherein the instructions further cause the client to validate the master key ($K_m$).

3. The system recited in claim 2 wherein the instructions further cause the client to decrypt encrypted private data using the validated master key ($K_m$).

4. The system recited in claim 2 wherein the instructions further cause the client to send proof of the validated master key (Km) and each blinded password value ($P^x$) to the servers.

5. The system recited in claim 1 wherein the authentication servers include a memory for maintaining instructions which, when executed by the authentication servers, cause the authentication servers to:
   maintain a count of bad login attempts, the number of recent amplifications, a list of recent $P^x$ password amplification request values, and a list of timestamps associated with the list of recent password amplification request values on the server;
   receives a blinded password ($P^x$) request
   records the blinded password in a short-term list
   checks a user account to see if it is locked;
   creates a blinded key share ($P^{xy_i}$) in response to the blinded password request; and
   sends the blinded key share to the client if it is unlocked.

6. The system recited in claim 5 wherein the instructions further cause the authentication servers to:
   records a timestamp value to note the time that the request was received;
   periodically checks for stale requests which are determined when the difference between any timestamp value and the current time becomes greater than a specific period of time;
   deletes corresponding password amplification request values and timestamps; and
   increments the count of bad attempts.

7. The system recited in claim 5 wherein, when a successful login occurs, the instructions further cause the authentication servers to:
   sends a value of $Q_A$, equal to the password raised to a random power, along with any prior values for $Q_A$ from earlier runs in the same login session, to each sewer in an encrypted message; and
   authenticate the encrypted message using the master key $K_m$.

8. A method that provides for remote password authentication using a system including a client, a plurality of authentication servers, and a network interconnecting the client and the plurality of authentication servers, the method comprising the steps of:
   receiving a password;
   deriving group elements (P) from the password;
   sending blinded password value ($p^x$) to the servers;
   receiving blinded key shares ($P^{xy_i}$) from the servers;
   unblinding and combining the key shares to create a master key ($K_m$); and
   decrypting encrypted private data using the master key ($K_m$).

9. The method recited in claim 8 further comprising the step of validating the waster key ($K_m$).

10. The method recited in claim 9 further comprising the step of decrypting encrypted private data using the validated master key ($K_m$).

11. The method recited in claim 9 further comprising the step of sending proof of the validated master key ($K_m$) and each blinded password value ($P^x$) to the servers.

12. The method recited in claim 8 further comprising the steps of:
   maintaining a count of bad login attempts, the number of recent amplifications, a list of recent $P^x$ password amplification request values, and a list of timestamps associated with the list of recent password amplification request values on the server;
   receiving a blinded password ($P^x$) request
   recording the blinded password in a short-term list
   checking a user account to see if it is locked;
   creating blinded key share ($P^{xy_i}$) in response to the blinded password request; and
   sending the blinded key share to the client if it is unlocked.

13. The method recited in claim 12 further comprising the steps of:
   recording a timestamp value to note the time that the request was received;
   periodically checking for stale requests which are determined when the difference between any timestamp value and the current time becomes greater than a specific period of time;
   checking corresponding password amplification request values and timestamps; and
   incrementing the count of bad attempts.

14. The method recited in claim 12 further comprising the steps of
   sending the value of $Q_A$, equal to the password raised to a random power, along with any prior values for $Q_A$ from earlier runs in the same login session, to each server in an encrypted message; and
   authenticating the encrypted message using the master key $K_m$.

15. A computer program embodied on a computer-readable medium for enabling remote password authentication in a multiple-server system including a client, a plurality of authentication servers, and a network interconnecting the client and the plurality of authentication servers, the computer program comprising:
   a code segment that enters a password;
   a data storage area that contains a unique random value $y_i$ on each of the servers,
   a code segment that derives a group element (P) from the password;
   a code segment that sends blinded password value ($P^x$) to the servers;
   a code segment that provided for receiving blinded key shares ($P^{xy_i}$) from the servers;
   a code segment that unblinds and combines the shares to create a master key ($K_m$); and
   a code segment that decrypts encrypted private data on the client computer using the master key ($K_m$).

16. The computer program recited in claim 15 further comprising a code segment that validates the master key ($K_m$).

17. The computer program recited in claim 16 further comprising a code segment that decrypts encrypted private data using the validated master key ($K_m$).

18. The computer program recited in claim 16 further comprising a code segment that sends proof of the validated master key ($K_m$) and the blinded password value ($P^x$) to the servers.

19. The computer program recited in claim 15 further comprising a code segment that:
   maintains a count of bad login attempts, the number of recent amplifications, a list of recent $P^x$ password amplification request values, and a list of timestamps associated with the list of recent password amplification request values on the server;
   receives a blinded password ($P^x$) request
   records the blinded password in a short-term suspect list checks a user account to see if such account is locked;

creates a blinded key share ($P^{xyj}$) if the user account is unlocked; and sends the blinded key share to the client.

20. The computer program recited in claim 19 further comprising a code segment that:

records timestamp value to note the time that the request was received;

periodically checks for stale requests which are determined when the difference between any timestamp value and the current time becomes greater than a specific period of time;

deletes corresponding password amplification request values and timestamps; and increments the count of bad attempts.

21. The computer program recited in claim 19 further comprising a code segment that:

sends the value of $Q_A$, equal to the password raised to a random power, along with any prior values for $Q_A$ from earlier runs in the same login session, to each server in an encrypted message; and authenticates this message using the master key $K_m$.

* * * * *